US012799295B2

(12) United States Patent
Sakamura et al.

(10) Patent No.: US 12,799,295 B2
(45) Date of Patent: Nov. 17, 2026

(54) METHOD FOR PRODUCING POLYPROPYLENE-BASED RESIN EXPANDED BEADS AND MOLDED ARTICLE OF POLYPROPYLENE-BASED RESIN EXPANDED BEADS

(71) Applicant: JSP CORPORATION, Tokyo (JP)

(72) Inventors: Takumi Sakamura, Tochigi (JP); Hajime Ohta, Tochigi (JP)

(73) Assignee: JSP CORPORATION, Tokyo (JP)

(*) Notice: Subject to any disclaimer, the term of this patent is extended or adjusted under 35 U.S.C. 154(b) by 448 days.

(21) Appl. No.: 18/699,674

(22) PCT Filed: Sep. 28, 2022

(86) PCT No.: PCT/JP2022/036167
§ 371 (c)(1),
(2) Date: Apr. 9, 2024

(87) PCT Pub. No.: WO2023/063081
PCT Pub. Date: Apr. 20, 2023

(65) Prior Publication Data

US 2024/0400782 A1 Dec. 5, 2024

(30) Foreign Application Priority Data

Oct. 12, 2021 (JP) ................................ 2021-167457

(51) Int. Cl.
*C08J 9/232* (2006.01)
*C08J 9/00* (2006.01)
(Continued)

(52) U.S. Cl.
CPC ............ *C08J 9/232* (2013.01); *C08J 9/0066* (2013.01); *C08J 9/18* (2013.01); *C08K 3/04* (2013.01);
(Continued)

(58) Field of Classification Search
CPC ... C08J 9/232; C08J 9/0066; C08J 9/18; C08J 2203/02; C08J 2205/044; C08J 2323/12;
(Continued)

(56) References Cited

U.S. PATENT DOCUMENTS 9,079,360 B2 7/2015 Nohara et al.
10,221,292 B2 3/2019 Yoshida et al.
(Continued)

FOREIGN PATENT DOCUMENTS

CN 107835832 A * 3/2018 ............... C08J 9/18
JP 07-300537 A 11/1995
(Continued)

OTHER PUBLICATIONS

Extended European Search Report issued Nov. 22, 2024 in European Patent Application No. 22880777.2, 8 pages.
(Continued)

*Primary Examiner* — K. Boyle
(74) *Attorney, Agent, or Firm* — Oblon, McClelland, Maier & Neustadt, L.L.P.

(57) ABSTRACT

A method for producing polypropylene-based resin expanded beads each having a through-hole by performing a first expanding step and a second expanding step is provided. In the first expanding step, tubular resin particles containing carbon black and having through-holes are dispersed in a dispersion medium and released to an environment under a low pressure, thereby obtaining first-step expanded beads having a bulk ratio of $M_1$ times. In the second expanding step, the first-step expanded beads are further expanded to obtain polypropylene-based resin expanded beads having a bulk ratio of $M_2$ times. The bulk ratio $M_1$ is 5 times or more and 25 times or less. A ratio $M_2/M_1$ of the bulk ratio $M_2$ to the bulk ratio $M_1$ is 1.2 or more and 3.0 or less.

10 Claims, 7 Drawing Sheets

(51) Int. Cl.
*C08J 9/18* (2006.01)
*C08K 3/04* (2006.01)

(52) U.S. Cl.
CPC ...... *C08J 2203/02* (2013.01); *C08J 2205/044* (2013.01); *C08J 2323/12* (2013.01)

(58) Field of Classification Search
CPC .. C08J 9/122; C08J 2201/034; C08J 2203/06; C08J 2205/052; C08J 2323/10; C08J 2323/14; C08J 2323/16; C08J 2423/02; C08J 2423/16; C08J 9/12; C08J 9/224; C08J 9/228; C08K 3/04; B29C 44/3461; B29C 44/3426; B29C 44/445; B29C 44/02; B29K 2023/12
See application file for complete search history.

(56) References Cited

U.S. PATENT DOCUMENTS

| | | | |
|---|---|---|---|
| 10,403,416 B2 | | 9/2019 | Sato |
| 11,732,101 B2 | | 8/2023 | Shimada et al. |
| 2013/0266792 A1 | | 10/2013 | Nohara et al. |
| 2017/0162292 A1 | * | 6/2017 | Sato ........................ C08J 9/0061 |
| 2017/0218158 A1 | | 8/2017 | Yoshida et al. |
| 2018/0186959 A1 | | 7/2018 | Yoshida et al. |
| 2023/0074915 A1 | | 3/2023 | Shimada et al. |

FOREIGN PATENT DOCUMENTS

| | | | | | |
|---|---|---|---|---|---|
| JP | 2004068016 A | * | 3/2004 | |
| JP | 2012126816 A | * | 7/2012 | ........... B29C 67/205 |
| JP | 2015-143046 A | | 8/2015 | |
| JP | 2018162369 A | * | 10/2018 | |
| WO | WO 2016/027892 A1 | | 2/2016 | |
| WO | WO 2016/060162 A1 | | 4/2016 | |
| WO | WO 2021/157369 A1 | | 8/2021 | |

OTHER PUBLICATIONS

Japanese Notice of Reasons for Refusal issued Jul. 15, 2025 in Japanese Patent Application No. 2021-167457 with English translation, 8 pgs.

International Search Report mailed on Dec. 20, 2022 in PCT/JP2022/036167 filed on Sep. 28, 2022 (2 pages).

English Translation of Written Opinion Issued Dec. 20, 2022 in PCT/JP2022/036167, 5 pages.

* cited by examiner

METHOD FOR PRODUCING POLYPROPYLENE-BASED RESIN EXPANDED BEADS AND MOLDED ARTICLE OF POLYPROPYLENE-BASED RESIN EXPANDED BEADS

CROSS-REFERENCE TO RELATED APPLICATIONS

The present application is a 35 U.S.C. § 371 National Stage Application of International Patent Application PCT/JP2022/036167, filed Sep. 28, 2022, which is based on and claims the benefit of priority to Japanese Application No. 2021-167457, filed Oct. 12, 2021. The entire contents of these applications are incorporated herein by reference.

TECHNICAL FIELD

The present disclosure relates to a method for producing black polypropylene-based resin expanded beads, and a method for producing a molded article of expanded beads using the expanded beads.

BACKGROUND ART

A molded article of polypropylene-based resin expanded beads is lightweight and excellent in cushioning property, rigidity, and the like, and thus is used for various applications. The molded article of polypropylene-based resin expanded beads is produced, for example, by an in-mold molding method in which polypropylene-based resin expanded beads are filled in a mold and heated with steam to secondarily expand the expanded beads, and at the same time, the surfaces of the expanded beads are melted and fusion-bonded to each other to mold the expanded beads into a desired shape. The molded article immediately after molding tends to swell due to secondary expansion, and thus, for obtaining a molded article of expanded beads having a desired shape, the molded article of expanded beads is cooled in the mold with water, air, or the like, and then demolded.

From the viewpoint of excellent productivity, the polypropylene-based resin expanded beads used in the production of the molded article of expanded beads as described above are often produced by a method in which polypropylene-based resin particles are dispersed in a dispersion medium in a sealed container, then the resin particles in the dispersion medium are impregnated with an inorganic physical blowing agent, and the resin particles impregnated with the blowing agent are released from the sealed container into a low-pressure environment together with the dispersion medium. Hereinafter, such an expanding method is referred to as a direct expanding method.

For example, a black molded article of expanded beads is required from the viewpoint of obtaining a luxurious feeling. The black molded article of expanded beads is obtained by in-mold molding of polypropylene-based resin expanded beads containing carbon black as a colorant (see Patent Literature 1).

PRIOR ART LITERATURE

Patent Literature

Patent Literature 1: JP-A-07-300537

SUMMARY OF INVENTION

Problems to be Solved by Invention

In recent years, the application of the molded article of expanded beads has been expanded, and a molded article of expanded beads having higher blackness and a molded article of expanded beads having less color unevenness have been demanded depending on its application. In the method of Patent Literature 1, blackness is reduced or color unevenness occurs, and thus, there is room for improvement of blackness and color unevenness. In addition, when an addition amount of carbon black is increased in order to improve blackness and color unevenness, it is necessary to increase a molding heating temperature (specifically, molding pressure) so as to obtain a good molded article of expanded beads from the viewpoint of fusion-bondability, and the cooling time (specifically, water cooling time) becomes long, which may deteriorate the productivity.

The present invention has been made in view of such a background, and is directed to providing a method for producing polypropylene-based resin expanded beads with which a molded article of expanded beads having high blackness and less noticeable color unevenness can be molded with high productivity at a low molding heating temperature, and a method for producing a molded article of expanded beads using the polypropylene-based resin expanded beads.

Means for Solving Problem

One aspect of the present invention is a method for producing polypropylene-based resin expanded beads each having a tubular shape with a through-hole, the method including:

a first expanding step of impregnating polypropylene-based resin particles dispersed in a dispersion medium with an inorganic physical blowing agent in a sealed container and releasing the resin particles together with the dispersion medium from the sealed container to a lower pressure environment than a pressure in the sealed container to obtain first-step expanded beads having a bulk ratio of $M_1$; and a second expanding step of further expanding the first-step expanded beads by increasing a pressure in cells of the first-step expanded beads and then heating the first-step expanded beads to obtain polypropylene-based resin expanded beads having a bulk ratio of $M_2$, wherein each of the resin particles has a tubular shape having a through-hole, the resin particles contain carbon black, and an amount of the carbon black in the resin particles is 0.1 wt % or more and 5 wt % or less, the bulk ratio $M_1$ of the first-step expanded beads is 5 times or more and 25 times or less, and a ratio $M_2/M_1$ of the bulk ratio $M_2$ of the polypropylene-based resin expanded beads to the bulk ratio $M_1$ of the first-step expanded beads is 1.2 or more and 3.0 or less.

Another aspect of the present invention is a method for producing a molded article of polypropylene-based resin expanded beads, the method including filling the polypropylene-based resin expanded beads obtained by the above production method in a mold, and supplying a heating medium to fusion-bond the expanded beads to each other.

Effects of Invention

In the above production method, by performing the first expanding step and the second expanding step, black polypropylene-based resin expanded beads each having a tubular shape with a through-hole are obtained. According to the polypropylene-based resin expanded beads thus obtained, the molded article of expanded beads having high blackness and less noticeable color unevenness can be molded with high productivity at a low molding heating temperature.

MODE FOR CARRYING OUT INVENTION

Figure 1:
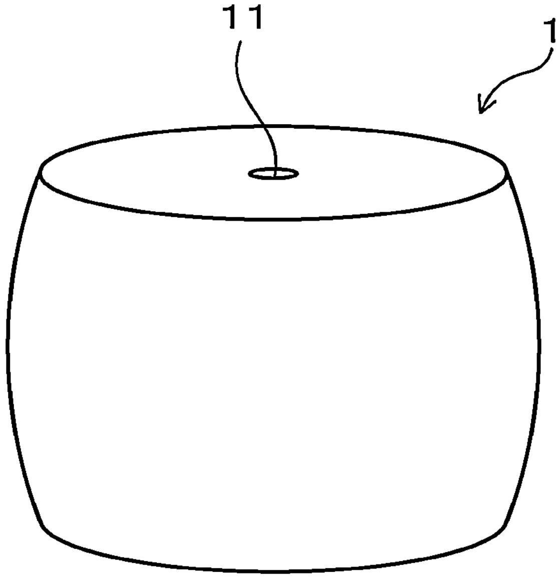
FIG. 1 is a schematic diagram of an appearance of an expanded bead.

In the present specification, when numerical values or physical property values are presented sandwiching "to" by placing the values before and after "to", such as "A to B", the values before and after "to" are to be also included, having the same meaning as "A or more and B or less". In addition, when a numerical value or a physical property value is expressed as a lower limit, it means that a value is equal to or more than the numerical value or the physical property value. When a numerical value or a physical property value is expressed as an upper limit, it means that a value is equal to or less than the numerical value or the physical property value. In addition, "wt %" and "mass %", and "parts by weight" and "parts by mass" are substantially synonymous, respectively. In the present specification, the polypropylene-based resin expanded beads are appropriately referred to as "second-step expanded beads" or "expanded beads", and the molded article of expanded beads is appropriately referred to as "molded article". The expanded beads obtained in the first expanding step are appropriately referred to as "first-step expanded beads". Note that expanded beads having a foamed layer constituted by a polypropylene-based resin are generally called polypropylene-based resin expanded beads.

In the production method of the present disclosure, the first expanding step and the second expanding step are performed to obtain expanded beads each having a tubular shape with a through-hole and containing carbon black. The expanded beads are black, and are used for producing a black molded article. Specifically, a molded article is obtained by filling the expanded beads in a mold, supplying a heating medium to the mold, and fusion-bonding the expanded beads to each other. The molded article immediately after molding tends to swell due to secondary expansion, and thus, for obtaining a molded article of expanded beads having a desired shape, the molded article of expanded beads is cooled in the mold with water, air, or the like, and then demolded. Such a molding method is appropriately referred to as "in-mold molding".

In the above production method, resin particles each having a tubular shape with a through-hole containing carbon black in a range of 0.1 wt % or more and 5 wt % or less are used. Furthermore, the bulk ratio $M_1$ of the first-step expanded beads obtained in the first expanding step is adjusted to a range of 5 to 25 times, and the ratio $M_2/M_1$ of the bulk ratio $M_1$ to the bulk ratio $M_2$ of the polypropylene-based resin expanded beads (that is, the second-step expanded beads) obtained in the second expanding step is adjusted to 1.2 or more and 3.0 or less. According to the polypropylene-based resin expanded beads thus obtained, the molded article of expanded beads having high blackness and less noticeable color unevenness can be molded with high productivity at a low molding heating temperature (specifically, low molding pressure). According to the above production method, expanded beads having a high closed cell content can be obtained. Furthermore, in the second expanding step, it is possible to suppress a phenomenon in which the first-step expanded beads are fusion-bonded to each other to form a lump (a phenomenon called blocking). These effects are achieved by performing the first expanding step and the second expanding step so that the bulk ratio $M_1$ and the bulk ratio $M_2$ fall within the above ranges while using resin particles containing carbon black in the predetermined range and having a tubular shape with a through-hole.

In a case where the bulk ratio $M_1$ of the first-step expanded beads is less than 5 times, it may be difficult to sufficiently increase the closed cell content of the expanded beads obtained in the second expanding step, or blocking may easily occur. From such a viewpoint, the bulk ratio $M_1$ of the first-step expanded beads is preferably 8 times or more, more preferably 10 times or more, and still more preferably 12 times or more.

On the other hand, in a case where the bulk ratio $M_1$ of the first-step expanded beads exceeds 25 times, the blackness of the finally obtained molded article of expanded beads may be insufficient, or color unevenness may be easily noticeable. From such a viewpoint, the bulk ratio $M_1$ of the first-step expanded beads is preferably 20 times or less, and more preferably 18 times or less.

From the viewpoint of further increasing the closed cell content of the expanded beads and obtaining a molded article having higher blackness and less noticeable color unevenness, the bulk ratio $M_1$ of the first-step expanded beads is preferably 8 times or more and 20 times or less, and more preferably 10 times or more and 18 times or less.

In a case where the ratio $M_2/M_1$ of the bulk ratios is less than 1.2, the blackness of the finally obtained molded article of expanded beads may be insufficient, or color unevenness may be noticeable. From such a viewpoint, the ratio of $M_2/M_1$ of the bulk ratios is preferably 1.4 or more, more preferably 1.8 or more, and still more preferably 2.0 or more.

On the other hand, in a case where $M_2/M_1$ exceeds 3.0, it may be difficult to sufficiently increase the closed cell content of the expanded beads obtained in the second expanding step, or blocking may easily occur. From such a viewpoint, the ratio $M_2/M_1$ of the bulk ratios is preferably 2.8 or less, and more preferably 2.5 or less.

From the viewpoint of further increasing the closed cell content of the expanded beads and obtaining a molded article having higher blackness and less noticeable color unevenness, the ratio $M_2/M_1$ of the bulk ratios is preferably 1.4 or more and 2.8 or less, and more preferably 1.8 or more and 2.5 or less.

The bulk ratio $M_1$ of the first-step expanded beads is a value determined as follows. First, a bulk density [kg/$m^3$] of the first-step expanded beads is measured by a method described below. Next, a density [kg/$m^3$] of the polypropylene-based resin constituting the foamed layer of the first-step expanded beads is divided by a bulk density [kg/$m^3$] of the first-step expanded beads, whereby the bulk ratio $M_1$ [times] of the first-step expanded beads is determined.

The bulk ratio $M_2$ of the second-step expanded beads is a value determined as follows. First, a bulk density [kg/$m^3$] of the second-step expanded beads is measured by a method described below. Next, a density [kg/$m^3$] of the polypropylene-based resin constituting the foamed layer of the second-step expanded beads is divided by a bulk density [kg/$m^3$] of the second-step expanded beads, whereby the bulk ratio $M_1$ [times] of the second-step expanded beads is determined.

In the above production method, the second-step expanded beads are produced by performing an expanding process having two steps (that is, two-step expanding) of the first expanding step and the second expanding step, and adjusting the bulk density of the expanded beads obtained in each expanding step to the above predetermined range and relationship. The second-step expanded beads obtained by performing such two-step expanding enable the production of a molded article having high blackness and little color unevenness. The reason for this is considered as follows.

Conventionally, a molded article of expanded beads produced using the polypropylene-based resin expanded beads produced by the direct foaming method has a tendency that the blackness is easily reduced and color unevenness is easily noticeable. This tendency is particularly remarkable particularly in a case of attempting to expanding to a desired bulk ratio by one-time expanding. It is considered that this is because while a large number of cells are formed at the time of expanding, cells near the surfaces of the expanded beads are strongly affected by cooling, and as a result, the number of cells near the surfaces excessively increases. On the other hand, in the production method of the present disclosure, while adopting the direct foaming method as the first expanding step, the bulk ratio $M_1$ of the first-step expanded beads in the step is reduced, and the second expanding step is provided, so that the bulk ratio $M_2$ can be increased to a desired ratio within a range in which the relationship with the bulk ratio $M_1$ falls within the predetermined range. When expanded beads are produced by such a predetermined expanding process of two step, expanded beads having a desired bulk ratio can be obtained while suppressing an excessive increase in the number of cells on the surfaces. It is considered that as a result, according to the expanded beads obtained by the production method of the present disclosure, it is possible to produce a molded article having high blackness and less noticeable color unevenness.

In a case of producing second-step expanded beads having a desired bulk ratio $M_2$, from the viewpoint of further increasing blackness and further suppressing color unevenness, it is preferable to further decrease the bulk ratio $M_1$ in the first expanding step and to further increase the ratio $M_2/M_1$ of the bulk ratios in the second expanding step. Specifically, it is preferable that the bulk ratio $M_1$ of the first-step expanded beads is 5 times or more and 20 times or less, and the ratio $M_2/M_1$ of the bulk ratios is 1.4 or more and 3.0 or less, and it is more preferable that the bulk ratio $M_1$ of the first-step expanded beads is 10 times or more and 18 times or less, and the ratio $M_2/M_1$ of the bulk ratios is 1.8 or more and 2.5 or less.

From the viewpoint of obtaining expanded beads excellent in lightweight property while maintaining a high closed cell content, the bulk ratio $M_2$ of the polypropylene-based resin expanded beads (that is, the second-step expanded beads) is preferably 10 times or more and 75 times or less, more preferably 20 times or more and 75 times or less, still more preferably more than 30 times and 75 times or less, and particularly preferably 35 times or more and 50 times or less.

Conventionally, in expanded beads having a high bulk ratio, blackness is more likely to decrease and color unevenness is more likely to occur. According to the production method of the present disclosure, it is possible to suppress a decrease in blackness and occurrence of color unevenness even in a case of expanded beads having a high bulk ratio, for example, a bulk ratio exceeding 30 times.

In the above production method, resin particles containing carbon black in a range of 0.1 wt % or more and 5 wt % or less as a black colorant are used. In a case where the amount of carbon black is less than 0.1 wt %, the blackness of the molded article of expanded beads may be insufficient, or color unevenness may be noticeable in the molded article of expanded beads. From such a viewpoint, the amount of carbon black in the resin particles is preferably 0.5 wt % or more, more preferably 1.0 wt % or more, and still more preferably 2.0 wt % or more.

On the other hand, when the amount of carbon black is more than 5 wt %, it may be difficult to mold the expanded beads at a low molding heating temperature. In addition, the water cooling time may become long. From such a viewpoint, the amount of carbon black in the resin particles is preferably 4.5 wt % or less, more preferably 4.0 wt % or less, and still more preferably 3.5 wt % or less.

From the viewpoint of obtaining a molded article having higher blackness and less noticeable color unevenness with higher productivity, the amount of carbon black in the resin particles is preferably 0.5 wt % or more and 4.5 mass % or less, more preferably 1.0 wt % or more and 4.0 mass % or less, and still more preferably 2.0 wt % or more and 3.5 mass % or less.

As the carbon black, for example, channel black, roller black, furnace black, thermal black, acetylene black, Ketjen black, or the like can be used. From the viewpoint of excellent balance between dispersibility in a polypropylene-based resin and a material cost, furnace black is preferable as the carbon black.

In the above production method, tubular resin particles each having a through-hole is used, and the expanded beads each have a through-hole. Therefore, even in a case where a blending amount of carbon black is large within a range of 0.1 wt % to 5 wt %, good moldability can be exhibited at a low molding heating temperature and the molding cycle can be shortened in in-mold molding. The reason why the moldability of the expanded beads is improved is considered to be that when a heating medium such as steam supplied in the molding step passes through the through-holes and reaches the inside of the expanded bead group, the entire expanded beads filled in the mold are sufficiently heated, and the secondary expandability and fusion-bondability of the expanded beads are improved. The reason why the molding cycle is shortened is considered to be that the secondary expanding force can be moderately suppressed as compared with the expanded beads having no through-hole, and the cooling time in the molding step can be shortened. Cooling in the molding step is performed by, for example, water cooling.

Conventionally, expanded beads each having a through-hole have been suitably used for production of molded articles having high voidage and excellent sound absorbency and lightweight property due to the through-hole (for example, JP 2015-143046 A). On the other hand, in the expanded beads produced through the second expanding step, the through-holes tend to be crushed and reduced in size as compared with the expanded beads directly produced by one-step expanding and having the same apparent density, and it becomes difficult to take advantage of the characteristics of the expanded beads, and thus the expanded beads each having a through-hole have been rarely produced in the second-step expanding step.

In a cross section perpendicular to the penetration direction of the through-hole of the first-step expanded bead, the circularity of the through-hole is preferably 0.90 or more. In this case, the through-hole is less likely to be crushed in the second expanding step, and thus the effect of improving the moldability of the expanded beads and the effect of shortening the water cooling time at the time of molding are more easily exhibited. From such a viewpoint, the circularity of the through-hole is preferably 0.92 or more, and more preferably 0.95 or more.

The circularity of the through-hole can be adjusted to fall within the above range by, for example, changing the shape of a die for forming the through-hole or adjusting the water temperature at the time of cooling the strand, which is usually performed at a water temperature of about 25 °C, to a low temperature (for example, 15 °C or lower) in a granulation step of the resin particles. The upper limit of the circularity of the through-hole is 1. In addition, for example, in a case of attempting to obtain expanded beads having a small average hole diameter d, in which an average hole diameter d of through-holes of expanded beads (that is, the second-step expanded beads) to be described below is less than 1 mm, the through-holes are more likely to be crushed during second-step expanding, and thus it is preferable to set the circularity of the through-holes of the first-step expanded beads within the above range.

The circularity of the through-hole of the first-step expanded bead is measured and calculated as follows. 50 or more first-step expanded beads randomly selected from the expanded bead group of the first-step expanded beads are cut perpendicularly to the penetration direction of each of the through-holes at a position where the area of the cut surface is maximum. A photograph of the cut surface of each first-step expanded bead is taken, and a cross-sectional area S (specifically, an opening area) and a peripheral length C (that is, a circumference of the opening) of a through-hole portion are determined. The circularity can be obtained by the following equation (a).

$$\text{Circularity} = 4\pi S/(C \times C) \qquad (\alpha)$$

Here, π means a circular constant.

Even in a case where the hole diameter of the through-hole of each of the first-step expanded beads is not uniform in the penetration direction, the circularity of the through-hole of each of the first-step expanded beads is determined by the circularity of the through-hole at the position where the area of the cut surface of the first-step expanded bead is maximum as described above.

A preferred form of the expanded beads obtained by the above production method will be described.

Figure 2:
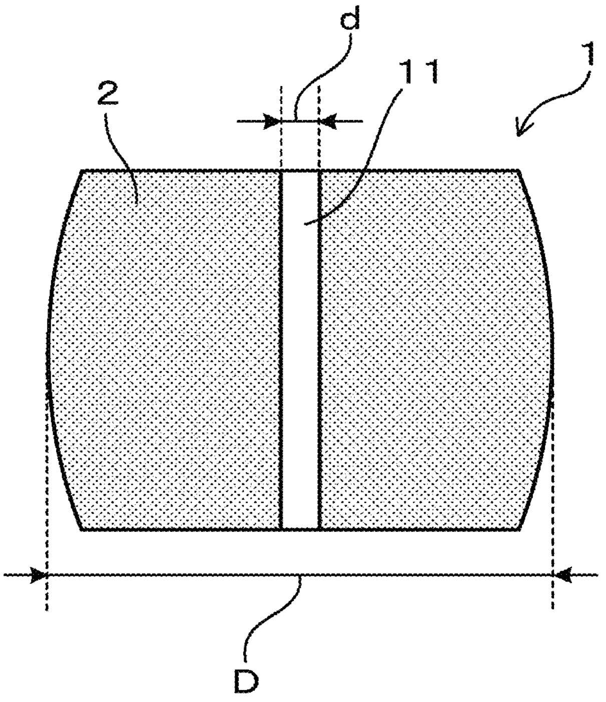
FIG. 2 is a schematic cross-sectional view of the expanded bead having no cover layer in a direction parallel to a penetration direction of a through-hole.
Figure 3:
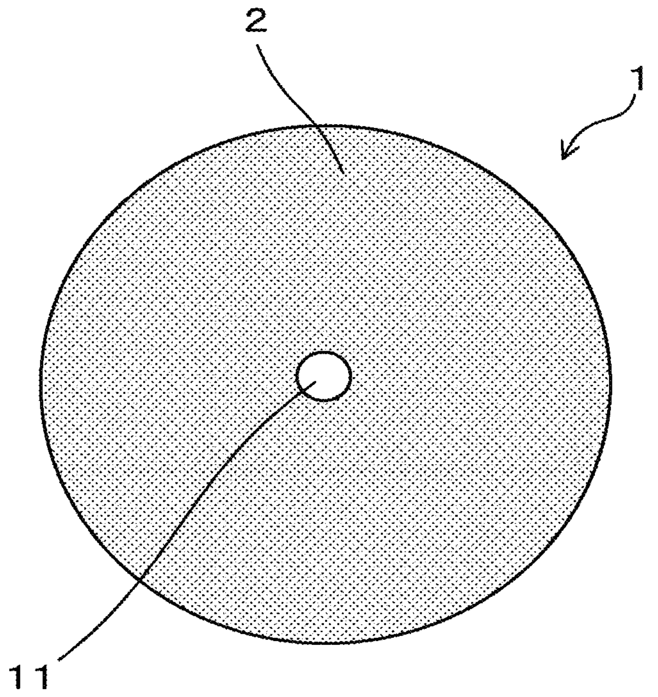
FIG. 3 is a schematic cross-sectional view of the expanded bead having no cover layer in a direction orthogonal to the penetration direction of the through-hole.
Figure 4:
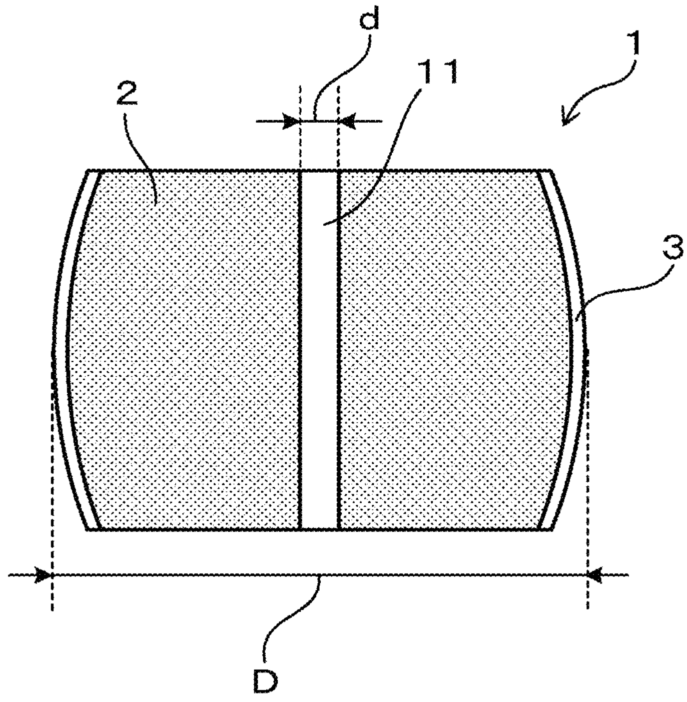
FIG. 4 is a schematic cross-sectional view of an expanded bead having a cover layer in a direction parallel to a penetration direction of a through-hole.
Figure 5:
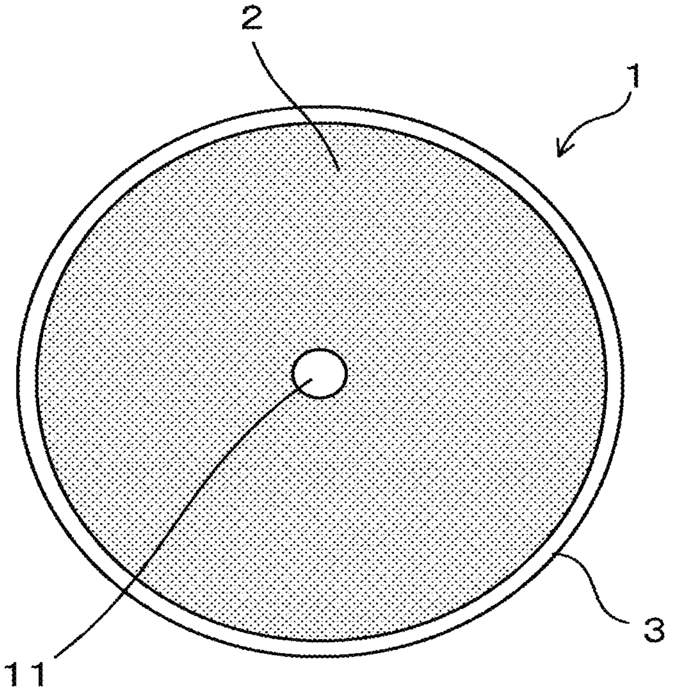
FIG. 5 is a schematic cross-sectional view of the expanded bead having a cover layer in a direction orthogonal to the penetration direction of the through-hole.

As exemplified in FIGS. 1 to 5, an expanded bead 1 has a tubular shape and has a through-hole 11. As illustrated in FIGS. 2 to 5, the expanded bead 1 has a foamed layer 2 including a polypropylene-based resin. As illustrated in FIGS. 2 and 3, the expanded bead 1 may be constituted of a polypropylene-based resin in a foamed state, but as illustrated in FIGS. 4 and 5, the expanded bead 1 preferably has the foamed layer 2 including a polypropylene-based resin in a foamed state, and a cover layer 3 covering the foamed layer 2. Note that FIGS. 1 to 5 are examples of the form of the expanded bead, and the present invention is not limited to these drawings.

In a case where the expanded bead 1 has the foamed layer 2 and the cover layer 3, both the foamed layer 2 and the cover layer 3 preferably contain carbon black, and the amount thereof in each layer is preferably 0.1 wt % or more and 5 wt % or less, more preferably 0.5 wt % or more and 4.5 wt % or less, still more preferably 1.0 wt % or more and 4.0 wt % or less, and particularly preferably 2.0 wt % or more and 3.5 wt % or less. In this case, the color unevenness of the molded article can be made less noticeable. From the same viewpoint, the amount of carbon black in the foamed layer 2 and the cover layer 3 are preferably about the same.

It is preferable that the expanded bead 1 has a tubular shape such as a cylinder or a square cylinder, and has at least one tubular hole (that is, the through-hole 11) penetrating in the axial direction thereof. It is more preferable that the expanded bead 1 has a cylinder shape and has a tubular hole penetrating in the axial direction thereof.

An average hole diameter d of the through-holes 11 of the expanded beads can be, for example, 5 mm or less, preferably 4 mm or less, and more preferably 3 mm or less. A ratio d/D of the average hole diameter d of the through-holes 11 to an average outer diameter D of the expanded beads 1 can be, for example, 1 or less.

The average hole diameter d of the through-holes 11 of the expanded beads is preferably less than 1 mm, and the ratio d/D of the average hole diameter d to the average outer diameter D of the expanded beads is preferably 0.4 or less. In this case, even if an aging step is omitted, a molded article having high blackness, less noticeable color unevenness, a desired shape, and excellent surface property and rigidity can be obtained. From such a viewpoint, the average hole diameter d of the through-holes is preferably 0.95 mm or less, more preferably 0.90 mm or less, and still more preferably 0.85 mm or less. From the same viewpoint, the ratio d/D is preferably 0.35 or less, more preferably 0.3 or less, and still more preferably 0.25 or less. Note that from the viewpoint of ease of production and suppression of collapse of the through-holes in a mold, the average hole diameter d of the expanded beads is preferably 0.2 mm or more, and more preferably 0.4 mm or more. From the same viewpoint, the ratio d/D is preferably 0.05 or more. In a case where the aging step is omitted, for example, the shape of the molded article can be stabilized by allowing the molded article after demolding to stand in an environment of, for example, 23 °C for 12 hours or longer.

Note that the aging step is a step usually performed after in-mold molding of the polypropylene-based resin expanded beads, and specifically, a step of allowing the molded article after demolding to stand for a predetermined time in a high-temperature atmosphere adjusted to a temperature of about 60 °C to 80 °C to recover the volume shrinkage of the molded article due to heating during molding. However, it is also possible to carry out the aging step. In addition, at the time of molding, pretreatment pressurization that applies an internal pressure in advance to the expanded beads before being filled in the mold may be performed in advance, or the pretreatment pressurization need not be performed. Even if the pretreatment pressurization is omitted, a molded article of expanded beads having high blackness, less noticeable color unevenness, a desired shape, and excellent surface property and rigidity can be produced while omitting the aging step.

The reason why when the average hole diameter d of the through-holes of the expanded beads is less than 1 mm and the ratio d/D of the average hole diameter d to the average outer diameter D of the expanded beads is 0.4 or less, a molded article having a desired shape and excellent surface property and rigidity can be obtained even if the aging step is omitted is not clear, but it is considered as follows. The molded article obtained by in-mold molding of the expanded beads has minute voids that communicate with each other and are derived from the through-holes and the like of the expanded beads. Thus, air quickly flows into the cells in the molded article after demolding, and the internal pressure of the entire molded article is increased, so that the dimensions of the molded article are likely to be stabilized early. In a case where the expanded beads have no through-hole, significant shrinkage and deformation of the molded article cannot be suppressed when the aging step is omitted. In addition, wall thicknesses of the tubular expanded beads are sufficiently secured as compared with the expanded beads in which the average hole diameter d of the expanded beads and/or the ratio d/D of the average hole diameter d to the average outer diameter D of the expanded beads is large, and thus the secondary expandability of the expanded beads is enhanced, and the molded article is excellent in surface property and rigidity.

The average hole diameter d of the expanded beads can be adjusted by adjusting a hole diameter dr of a through-hole in a resin particle described below. In addition, it can also be adjusted by adjusting the apparent density of the expanded beads and the heat of fusion of the high-temperature peak. In the second expanding step, the average hole diameter d can be more easily adjusted to a small value by adjusting the ratio $M_2/M_1$ of the bulk ratios to be high within the above range. The average outer diameter D of the expanded beads can be adjusted by adjusting an average outer diameter Dr in a resin particle described below.

The average hole diameter d of the through-holes of the expanded beads is determined as follows. 50 or more expanded beads randomly selected from the expanded bead group are cut perpendicularly to the penetration direction of each of the through-holes at a position where the area of the cut surface is maximum. A photograph of the cut surface of each expanded bead is taken, the cross-sectional area (specifically, the opening area) of the through-hole portion is determined, the diameter of a virtual perfect circle having the same area as the area is calculated, and the arithmetic average thereof is taken as the average hole diameter d of the through-holes of the expanded beads. Even in a case where the hole diameter of the through-hole of each of the expanded beads is not uniform in the penetration direction, the hole diameter of the through-hole of each of the expanded beads is determined by the hole diameter at the position where the area of the cut surface of the expanded bead is maximum as described above.

From the viewpoint that the wall thicknesses of the tubular expanded beads increase and the secondary expandability of the expanded beads and the rigidity of the molded article are improved, the average outer diameter D of the expanded beads is preferably 2 mm or more, more preferably 2.5 mm or more, and still more preferably 3 mm or more. On the other hand, from the viewpoint of improving the filling property into the mold during molding, the average outer diameter D is preferably 5 mm or less, more preferably 4.5 mm or less, and still more preferably 4.3 mm or less.

The average outer diameter D of the expanded beads is determined as follows. 50 or more expanded beads randomly selected from the expanded bead group are cut perpendicularly to the penetration direction of each of the through-holes at a position where the area of the cut surface is maximum. A photograph of the cut surface of each expanded bead is taken, the cross-sectional area (specifically, a cross-sectional area also including an opening portion of the through-hole) of the expanded bead is determined, the diameter of a virtual perfect circle having the same area as the area is calculated, and the arithmetic average thereof is taken as the average outer diameter D of the expanded beads. Note that even in a case where the outer diameter of each of the expanded beads is not uniform in the penetration direction, the outer diameter of each expanded bead is determined by the outer diameter at the position where the expanded bead has a maximum cross-sectional area when cut perpendicularly to the penetration direction as described above.

The average value of wall thicknesses t of the tubular expanded beads is preferably 1.2 mm or more and 2 mm or less. When the average value of the wall thicknesses t is within this range, the wall thicknesses of the expanded beads are sufficiently large, so that the secondary expandability during in-mold molding is further improved. In addition, the expanded beads are more hardly crushed against an external force, and the rigidity of the molded article is further improved. From such a viewpoint, the average wall thickness t of the expanded beads is more preferably 1.3 mm or more and 2 mm or less, and still more preferably 1.5 mm or more and 2 mm or less.

The average wall thickness t of the expanded beads is a distance from the surface (that is, the outer surface) of the expanded bead to an outer edge (that is, an inner surface of the expanded bead) of the through-hole, and is a value obtained by the following equation (1).

$$t=(D-d)/2 \quad (I)$$

d: Average hole diameter of through-holes (mm)

D: Average outer diameter of expanded beads (mm)

The ratio t/D of the average wall thickness t to the average outer diameter D of the expanded beads is preferably 0.35 or more and 0.5 or less. When t/D is within the above range, the filling property of the expanded beads is good and the secondary expandability is further improved in in-mold molding of the expanded beads. Thus, a molded article excellent in surface property and rigidity can be produced at a lower molding heating temperature.

The foamed layer includes a polypropylene-based resin. In the present specification, the polypropylene-based resin refers to a homopolymer of a propylene monomer and a propylene-based copolymer containing 50 mass % or more of structural units derived from propylene. The polypropylene-based resin is preferably a propylene-based copolymer obtained by copolymerizing propylene with another monomer.

Preferable examples of the propylene-based copolymer include copolymers of propylene and an α-olefin having 4 to 10 carbon atoms, such as an ethylene-propylene copolymer, a butene-propylene copolymer, a hexene-propylene copolymer, and an ethylene-propylene-butene copolymer. These copolymers may be, for example, random copolymers or block copolymers, and are preferably random copolymers. The polypropylene-based resin may contain a plurality of types of polypropylene-based resins.

The polypropylene-based resin constituting the foamed layer may contain a polymer other than the polypropylene-based resin as long as the purpose and effect of the present disclosure are not impaired. Examples of the other polymer include thermoplastic resins other than polypropylene-based resins such as polyethylene-based resins and polystyrene-based resins, and elastomers. The amount of the other polymer in the polypropylene-based resin constituting the foamed layer is preferably 20 mass % or less, more preferably 10 mass % or less, still more preferably 5 mass % or less, and 0, that is, it is particularly preferable that the foamed layer substantially contains only the polypropylene-based resin as a polymer.

From the viewpoint of further enhancing the rigidity of the molded article, further suppressing a dimensional change when the aging step is omitted, molding a molded article excellent in surface property and rigidity at a lower molding heating temperature, and further improving the energy absorbability of the molded article, it is preferable that the polypropylene-based resin constituting the foamed layer is an ethylene-propylene random copolymer, and the amount of the ethylene component in the copolymer is 0.5 mass % or more and 5.0 mass % or less. Note that the total of the ethylene component and the propylene component in the ethylene-propylene random copolymer is 100 mass %.

From the viewpoint of further enhancing the rigidity of the molded article and from the viewpoint of more reliably suppressing the dimensional change in a case where the aging step is omitted, the amount of the ethylene component in the copolymer is more preferably 3.5 mass % or less, still more preferably 2.8 mass % or less, and particularly preferably 2.0 mass % or less. From the same viewpoint, the amount of the ethylene component in the copolymer is preferably 0.5 mass % or more.

On the other hand, from the viewpoint that a molded article having excellent surface property and rigidity can be molded at an even lower molding heating temperature (that is, at a low molding pressure) and from the viewpoint of obtaining a molded article of expanded beads having excellent energy absorbability, the amount of the ethylene component in the copolymer is more preferably 1.0 mass % or more, still more preferably 1.2 mass % or more, even more preferably 1.5 mass % or more, and particularly preferably more than 2.0 mass %. From the same viewpoint, the amount of the ethylene component in the copolymer is preferably 5.0 mass % or less.

Note that the amount of a monomer component in the copolymer can be determined by IR spectrum measurement. The ethylene component and the propylene component in the ethylene-propylene copolymer mean a structural unit derived from ethylene and a structural unit derived from propylene in the ethylene-propylene copolymer, respectively. The amount of each monomer component in the copolymer means the amount of a structural unit derived from each monomer in the copolymer.

A melting point Tmc of the polypropylene-based resin constituting the foamed layer is preferably 158 °C or lower. In this case, it is possible to mold a molded article excellent in surface property and rigidity at a lower molding temperature (that is, at a low molding pressure). From the viewpoint of improving this effect, the melting point Tmc of the polypropylene-based resin constituting the foamed layer is preferably 155 °C or lower, and more preferably 150 °C or lower. On the other hand, from the viewpoint of further improving the heat resistance, mechanical strength, and the like of the molded article, the melting point Tmc of the polypropylene-based resin constituting the foamed layer is preferably 135 °C or higher, more preferably 138 °C or higher, and still more preferably 140 °C or higher. From the viewpoint of further improving the moldability of the expanded bead, and further improving mechanical strength and the like of the molded article, the melting point Tmc of the polypropylene-based resin constituting the foamed layer is preferably 135 °C or higher and 158 °C or lower, more preferably 138 °C or higher and 155 °C or lower, and still more preferably 140 °C or higher and 150 °C or lower.

A melting point of the polypropylene-based resin is determined on the basis of JIS K 7121:1987. Specifically, "(2) The case of measurement of melting temperature after a definite heat treatment" is adopted as conditioning, a DSC curve is obtained by raising the temperature of a conditioned test piece from 30 °C to 200 °C at a heating rate of 10 °C/min, and a vertex temperature of the melting peak is defined as the melting point. Note that in a case where a plurality of melting peaks appear in the DSC curve, the vertex temperature of the melting peak having the largest area is defined as the melting point.

From the viewpoint of further improving the expandability and the moldability, a melt mass flow rate (that is, MFR) of the polypropylene-based resin constituting the foamed layer is preferably 5 g/10 min or more, more preferably 6 g/10 min or more, and still more preferably 7 g/10 min or more. On the other hand, from the viewpoint of further enhancing the rigidity of the molded article, the MFR is preferably 12 g/10 min or less, and more preferably 10 g/10 min or less. Note that the MFR of the polypropylene-based resin is a value measured under conditions of a test temperature of 230 °C and a load of 2.16 kg on the basis of JIS K 7210-1:2014.

From the viewpoint of further enhancing the rigidity of the molded article, further suppressing a dimensional change in a cases where the aging step is omitted, molding a molded article excellent in surface property and rigidity at a lower molding heating temperature, and further improving the energy absorbability of the molded article, a flexural modulus of the polypropylene-based resin constituting the foamed layer is preferably is 800 MPa or more and 1600 MPa or less.

From the viewpoint of enhancing the rigidity of the molded article and from the viewpoint of more reliably suppressing the dimensional change in a case where the aging process is omitted, the flexural modulus of the polypropylene-based resin constituting the foamed layer is preferably 850 MPa or more and 1600 MPa or less, more preferably 900 MPa or more and 1600 MPa or less, still more preferably 950 MPa or more and 1600 MPa or less, and particularly preferably 1200 MPa or more and 1600 MPa or less.

On the other hand, from the viewpoint that a molded article excellent in surface property and rigidity can be molded at an even lower molding temperature (that is, at a low molding pressure) and from the viewpoint of obtaining a molded article of expanded beads more excellent in energy absorbability, the flexural modulus of the polypropylene-based resin constituting the foamed layer is preferably 800

MPa or more and 1550 MPa or less, more preferably 800 MPa or more and 1500 MPa or less, and still more preferably 800 MPa or more and less than 1200 MPa.

Note that the flexural modulus of the polypropylene-based resin can be determined on the basis of JIS K 7171:2008.

From the viewpoint of ensuring good in-mold moldability of expanded beads and from the viewpoint of achieving good surface property and rigidity of the obtained molded article of expanded beads, a closed cell content of the expanded bead is preferably 88% or more, more preferably 90% or more, and still more preferably 95% or more.

The closed cell content of the expanded beads can be measured using an air-comparison pycnometer on the basis of ASTM-D 2856-70 Procedure C. Specifically, measurement is performed as follows. Expanded beads having a bulk volume of about 20 $cm^3$ after conditioning were used as a measurement sample to measure an apparent volume Va accurately by an ethanol immersion method as described below. After the measurement sample whose apparent volume Va has been measured is sufficiently dried, a true volume value Vx of the measurement sample to be measured is measured by AccuPyc II 1340 manufactured by Shimadzu Corporation in accordance with Procedure C described in ASTM-D 2856-70. Then, based on these volume values Va and Vx, the closed cell content is calculated by the following equation (11), and the average value of five samples (N=5) is defined as the closed cell content of the expanded beads.

$$\text{Closed cell content (\%)} = \left(Vx - W/\rho\right) \times 100/\left(Va - W/\rho\right) \quad \text{(II)}$$

In the equation,

- Vx: a true volume of the expanded bead measured by the above method, that is, a sum of a volume of the resin constituting the expanded bead and a total cell volume of closed cell portions in the expanded beads (unit: $cm^3$)
- Va: an apparent volume of the expanded beads measured from an increase in the liquid level when the expanded beads is immersed in a measuring cylinder containing ethanol (unit: $cm^3$)
- W: a weight of the measurement sample of the expanded beads (unit: g)
- ρ: a density of the resin constituting the expanded beads (unit: $g/cm^3$)

As described above, the expanded bead is preferably an expanded bead having a multilayer structure including a foamed layer and a cover layer covering the foamed layer. In a case where the expanded bead has a cover layer, the cover layer includes, for example, a polyolefin-based resin. Examples of the polyolefin-based resin include polyethylene-based resins, polypropylene-based resins, and polybutene-based resins. In the present specification, the polyethylene-based resin refers to a homopolymer of an ethylene monomer and an ethylene-based copolymer containing more than 50 mass % of structural units derived from ethylene. From the viewpoint of adhesiveness to the foamed layer, the polyolefin-based resin is preferably a polyethylene-based resin or a polypropylene-based resin, and more preferably a polypropylene-based resin. Examples of the polypropylene-based resin include an ethylene-propylene copolymer, an ethylene-butene copolymer, an ethylene-propylene-butene copolymer, and a propylene homopolymer, and among these, an ethylene-propylene copolymer or an ethylene-propylene-butene copolymer is preferable.

The polyolefin-based resin constituting the cover layer preferably has a melting point Tms lower than the melting point Tmc of the polypropylene-based resin constituting the foamed layer. That is, Tms<Tmc is preferably satisfied. In this case, the fusion-bondability of the expanded beads is improved, and molding at a lower temperature becomes possible. Furthermore, in this case, significant shrinkage and deformation in the case where the aging step is omitted can be more easily suppressed. The reason for this is not clear, but it is considered that by molding at a low molding heating temperature, the amount of heat received by the expanded beads by the heating medium such as steam in in-mold molding can be further suppressed, and dimensional change due to thermal shrinkage of the molded article is more easily suppressed. From the viewpoint of further improving the fusion-bondability and enabling molding at a lower temperature, preferably Tmc−Tms≥5 is satisfied, more preferably Tmc−Tms≥6 is satisfied, and still more preferably Tmc−Tms≥8 is satisfied. From the viewpoint of suppressing peeling between the foamed layer and the cover layer, adhesion between the expanded beads, and the like, preferably Tmc−Tms≤35 is satisfied, more preferably Tmc−Tms≤20 is satisfied, and still more preferably Tmc−Tms≤15 is satisfied.

From the viewpoint of further improving the fusion-bondability of expanded beads during molding, the melting point Tms of the polyolefin-based resin constituting the cover layer is preferably 120 °C or higher and 145 °C or lower, and more preferably 125 °C or higher and 140 °C or lower. The melting point of the polyolefin-based resin constituting the cover layer is determined on the basis of JIS K 7121:1987. Specifically, it is determined by the same conditions and method as those for the polypropylene-based resin constituting the foamed layer described above. In a case where a plurality of melting peaks appear in the DSC curve, the vertex temperature of the melting peak on the lowest temperature side is defined as the melting point.

From the viewpoint of reliably suppressing peeling between the foamed layer and the cover layer, an MFR of the polyolefin-based resin constituting the cover layer is preferably about the same as the MFR of the polypropylene-based resin constituting the foamed layer, and specifically, it is preferably 2 to 15 g/10 min, more preferably 3 to 12 g/10 min, and still more preferably 4 to 10 g/10 min. Note that in a case where the polyolefin-based resin is a polypropylene-based resin, the MFR is a value measured under conditions of a test temperature of 230 °C and a load of 2.16 kg on the basis of JIS K 7210-1:2014, and in a case where the polyolefin-based resin is a polyethylene-based resin, the MFR is a value measured under conditions of a test temperature of 190 °C and a load of 2.16 kg on the basis of JIS K 7210-1:2014.

In a case where the expanded bead is a particle having a multilayer structure including a foamed layer and a cover layer covering the foamed layer, the foamed layer includes a polypropylene-based resin in a foamed state, and the cover layer includes a polyolefin-based resin in a foamed state or a non-foamed state. The cover layer is preferably in a substantially non-foamed state. "Substantially non-foamed" includes a state in which cells disappear after expanding, and means that there is almost no cell structure. The thickness of the cover layer is, for example, 0.5 to 100 μm. In addition, an intermediate layer may be further provided between the foamed layer and the cover layer.

A mass ratio (ratio of mass %) of the resin constituting the foamed layer and the resin constituting the cover layer is preferably 99.5:0.5 to 80:20, more preferably 99:1 to 85:15, and still more preferably 97:3 to 90:10, from the viewpoint of enhancing the moldability while maintaining the rigidity of the molded article and from the viewpoint that significant shrinkage and deformation in the case where the aging step is omitted becomes easily suppressed. The mass ratio is represented by the resin constituting the foamed layer:the resin constituting the cover layer.

The expanded bead preferably has a crystal structure in which a melting peak (that is, an intrinsic peak) unique to the polypropylene-based resin and one or more melting peaks (that is, a high-temperature peak) appear on a high temperature side thereof in a DSC curve obtained when heated from 23 °C to 200 °C at a heating rate of 10 °C/min. The DSC curve is obtained by differential scanning calorimetry (DSC) in accordance with JIS K 7121:1987, using 1 to 3 mg of expanded beads as a test sample.

The intrinsic peak is an endothermic peak unique to the polypropylene-based resin constituting the expanded beads, and is considered to be due to endotherm at the time of melting of the crystal originally possessed by the polypropylene-based resin. On the other hand, the high-temperature peak is an endothermic peak appearing on the higher temperature side than the intrinsic peak in the DSC curve. In a case where this high-temperature peak appears, it is presumed that a secondary crystal is present in the resin. Note that in the DSC curve obtained by performing heating from 23 °C to 200 °C at a heating rate of 10 °C/min (that is, first heating), then cooling from 200 °C to 23 °C at a cooling rate of 10 °C/min, and then heating from 23 °C to 200 °C again at a heating rate of 10 °C/min (that is, second heating), only the intrinsic peak appears, and thus, it is possible to distinguish the intrinsic peak from the high-temperature peak. The peak temperature of the intrinsic peak may be slightly different between the first heating and the second heating, but the difference is usually within 5 °C.

A heat of fusion of the high-temperature peak of the expanded bead is preferably 5 J/g to 40 J/g, more preferably 7 to 30 J/g, and still more preferably 10 to 20 J/g from the viewpoint of further improving the moldability of the expanded beads and obtaining the molded article having excellent rigidity.

A ratio of the heat of fusion of the high-temperature peak to the heat of fusion of the entire melting peaks of the DSC curve (the heat of fusion of the high-temperature peak/the heat of fusion of the entire melting peaks) is preferably 0.05 to 0.3, more preferably 0.1 to 0.25, and still more preferably 0.15 to 0.2.

It is considered that when the ratio between the heat of fusion of the high-temperature peak and the heat of fusion of the entire melting peaks is set within such a range, the expanded beads have particularly excellent mechanical strength and excellent in-mold moldability due to the presence of secondary crystals appearing as the high-temperature peak.

Here, the heat of fusion of the entire melting peaks refers to the sum of the heats of fusion determined from the areas of all the melting peaks in the DSC curve.

Figure 7:
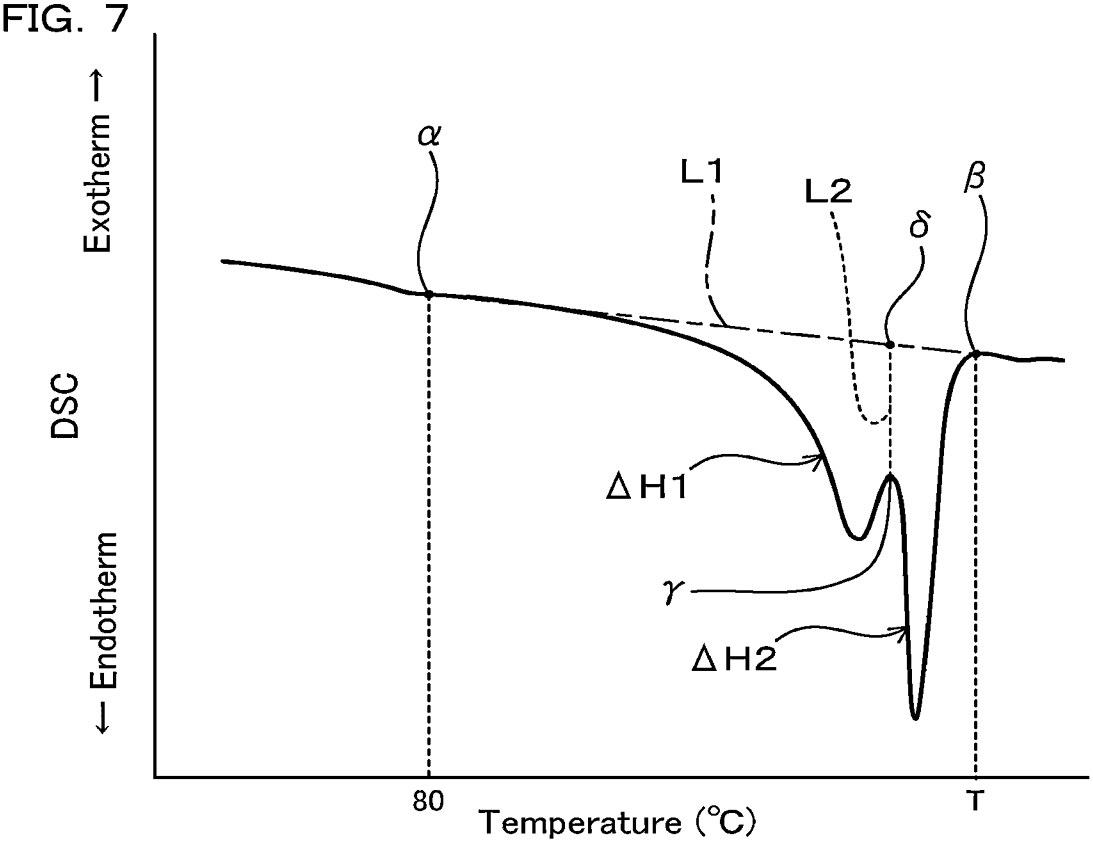
FIG. 7 is an explanatory diagram showing a method for calculating an area of a high-temperature peak.

The heat of fusion of each peak of the expanded beads described above is a value obtained as follows. First, one expanded bead is collected from the expanded bead group after conditioning. The expanded bead is used as a test piece to obtain a DSC curve when the test piece is heated from 23 °C to 200 °C at a heating rate of 10 °C/min by a differential scanning calorimeter. FIG. 7 shows an example of the DSC curve. As exemplified in FIG. 7, an intrinsic peak ΔH1 and a high-temperature peak ΔH2 having an apex on a higher temperature side than an apex of the intrinsic peak ΔH1 appear in the DSC curve.

Next, a straight line L1 is obtained by connecting a point a corresponding to 80 °C on the DSC curve and a point R corresponding to a melting end temperature T of the expanded bead. Next, a straight line L2 parallel to the vertical axis of the graph is drawn from a point γ on the DSC curve corresponding to the valley between the intrinsic peak ΔH1 and the high-temperature peak ΔH2, and a point at which the straight line L1 and the straight line L2 intersect is defined as 6. Note that the point γ can also be said to be a maximum point existing between the intrinsic peak ΔH1 and the high-temperature peak ΔH2.

An area of the intrinsic peak ΔH1 is an area of a portion surrounded by the curve of the intrinsic peak ΔH1 portion of the DSC curve, a line segment α-δ, and a line segment γ-δ, and this is taken as the heat of fusion of the intrinsic peak.

An area of the high-temperature peak ΔH2 is an area of a portion surrounded by the curve of the high-temperature peak ΔH2 portion of the DSC curve, a line segment δ-β, and a line segment γ-δ, and this is taken as the heat of fusion of the high-temperature peak.

An area of the entire melting peaks is an area of a portion surrounded by the curve of the intrinsic peak ΔH1 portion of the DSC curve, the curve of the high-temperature peak ΔH2 portion, and a line segment α-β (that is, the straight line L1), and this is taken as the heat of fusion of the entire melting peaks.

From the viewpoint of a balance between a lightweight property and rigidity of the molded article, the apparent density of the expanded beads is preferably 10 kg/m$^3$ or more and 150 kg/m$^3$ or less, more preferably 15 kg/m$^3$ or more and 100 kg/m$^3$ or less, still more preferably 20 kg/m$^3$ or more and 80 kg/m$^3$ or less, and particularly preferably 25 kg/m$^3$ or more and 45 kg/m$^3$ or less.

The apparent density of the expanded beads can be determined by immersing an expanded bead group (weight W (g) of the expanded bead group) left for 1 day under the conditions of a relative humidity of 50%, 23 °C, and 1 atm in a measuring cylinder containing an alcohol (for example, ethanol) at 23 °C using a wire mesh or the like, determining a volume V (L) of the expanded bead group from the increase in the liquid level, dividing the weight of the expanded bead group by the volume of the expanded bead group (W/V), and converting the unit into [kg/m$^3$].

From the viewpoint that molding can be performed with high productivity at a low molding heating temperature, from the viewpoint of shortening the water cooling time, and from the viewpoint of further suppressing significant shrinkage and deformation of the molded article in the case where the aging step is omitted, a ratio of the apparent density of the expanded beads to the bulk density of the expanded beads (that is, apparent density/bulk density) is preferably 1.7 or more. On the other hand, from the viewpoint of further enhancing the rigidity of the molded article and from the viewpoint of further improving the surface property, the apparent density/bulk density is preferably 1.7 or more and 2.3 or less, more preferably 1.7 or more and 2.1 or less, and still more preferably 1.7 or more and 1.9 or less.

The bulk density of the expanded beads is determined as follows. Expanded beads are randomly taken out from the expanded bead group and placed in a measuring cylinder having a volume of 1 L, a large number of the expanded beads are accommodated up to a scale of 1 L so as to be in a natural deposition state, a mass W2 [g] of the accommodated expanded beads is divided by an accommodation volume V2 (1 L) (W2/V2), and the unit is converted to [kg/m$^3$], whereby the bulk density of the expanded beads is obtained.

Next, each step of a method for producing expanded beads will be described. The polypropylene-based resin particles are appropriately referred to as "resin particles". Note that in a case where expanded beads each having a foamed layer and a cover layer are produced, resin particles (hereinafter, appropriately referred to as multilayer resin particles) each having a multilayer structure including a core layer and a cover layer covering the core layer are used as the resin particles.

The resin particles are produced, for example, as follows. First, a polypropylene-based resin serving as a base material resin, carbon black, and an additive such as a cell nucleating agent supplied as necessary are supplied into an extruder, and heated and kneaded to obtain a resin melt-kneaded product. The carbon black is added such that the amount of carbon black in the resin particles is 0.1 wt % or more and 5 wt % or less. Thereafter, the resin melt-kneaded product is extruded into a tubular strand having a through-hole from a small hole of a die attached to the tip of the extruder, cooled, and cut to obtain resin particles. The extrudate is cut, for example, with a pelletizer. The cutting method can be selected from a strand cutting method, a hot cutting method, an underwater cutting method, and the like. In this manner, tubular resin particles each having a through-hole can be obtained. Note that in a case of forming a cover layer, an extruder for forming a core layer and an extruder for forming a cover layer are used to obtain resin melt-kneaded products of respective raw materials, the melt-kneaded products are joined in a die and co-extruded to form a sheath-core type composite including a tubular core layer in a non-foamed state and a cover layer in a non-foamed state covering an outer peripheral side surface of the tubular core layer, and the composite is cooled and cut while being extruded into a strand shape from a pore of a spinneret attached to a tip of the extruder, whereby multilayer resin particles can be obtained.

A particle size Lr (in other words, the maximum length) of the resin particles is preferably 0.1 to 3.0 mm, and more preferably 0.3 to 1.5 mm. A ratio (Lr/Dr) of the maximum length Lr to the outer diameter Dr of the resin particles is preferably 0.5 to 5.0, and more preferably 1.0 to 3.0. In addition, an average mass per particle (determined from masses of 200 randomly selected particles) is preferably adjusted to 0.1 to 20 mg, more preferably 0.2 to 10 mg, still more preferably 0.3 to 5 mg, and particularly preferably 0.4 to 2 mg. A mass ratio of the core layer and the cover layer in the case of the multilayer resin particles is preferably 99.5:0.5 to 80:20, more preferably 99:1 to 85:15, and still more preferably 97:3 to 90:10. The mass ratio is represented by the core layer:the cover layer.

The average hole diameter d of the through-holes in the expanded beads can be adjusted within the above desired range by adjusting the hole diameter dr of the through-hole of the resin particle. The hole diameter dr of the through-hole of the core layer of the resin particle can be adjusted by, for example, a hole diameter of a small hole of a die for forming the through-hole (that is, an inner diameter of the die). In addition, by adjusting the hole diameter dr of the through-holes, the particle diameter, and the average mass of the resin particles, the average outer diameter and the average wall thickness of the expanded beads can be adjusted within the above desired ranges.

From the viewpoint of more reliably producing expanded beads in which the average hole diameter d of the through-holes is less than 1 mm and the ratio d/D of the average hole diameter d to the average outer diameter D is 0.4 or less, the average hole diameter dr of the through-holes of the resin particles is preferably less than 0.25 mm, more preferably less than 0.24 mm, and still more preferably 0.22 mm or less. From the viewpoint of the production stability of resin particles each having a through-hole, the average hole diameter dr of the through-holes of the resin particles is preferably 0.1 mm or more.

Furthermore, from the same viewpoint, a ratio dr/Dr of the average hole diameter dr to the average outer diameter Dr of resin particles is preferably 0.4 or less, more preferably 0.3 or less, still more preferably 0.25 or less, and particularly preferably 0.2 or less. From the viewpoint of the production stability of the resin particles each having a through-hole, the ratio dr/Dr of the average hole diameter dr to the average outer diameter Dr of the resin particles is preferably 0.1 or more.

The average hole diameter dr of the through-holes of the resin particles is determined as follows. 50 or more resin particles randomly selected from the resin particle group are cut perpendicularly to the penetration direction of each of the through-holes at a position where the area of the cut surface is maximum. A photograph of the cut surface of each resin particle is taken, the cross-sectional area (specifically, the opening area) of the through-hole portion is determined, the diameter of a virtual perfect circle having the same area as the area is calculated, and the arithmetic average thereof is taken as the average hole diameter dr of the through-holes of the resin particles. Note that even in a case where the hole diameter of the through-hole of each of the resin particles is not uniform in the penetration direction, the hole diameter of the through-hole of each of the resin particles is determined by the hole diameter at the position where the area of the cut surface of the resin particle is maximum as described above.

The average outer diameter Dr of the resin particles is determined as follows. 50 or more resin particles randomly selected from the resin particle group are cut perpendicularly to the penetration direction of each of the through-holes at a position where the area of the cut surface is maximum. A photograph of the cut surface of each resin particle is taken, the cross-sectional area (specifically, a cross-sectional area also including an opening portion of the through-hole) of the resin particle is determined, the diameter of a virtual perfect circle having the same area as the area is calculated, and the arithmetic average thereof is taken as the average outer diameter Dr of the resin particles. Note that even in a case where the outer diameter of each of the resin particles is not uniform in the penetration direction, the outer diameter of each resin particle is determined by the outer diameter at the position where the resin particle has a maximum cross-sectional area when cut perpendicularly to the penetration direction as described above.

Note that in the strand cutting method, the particle size, length/outer diameter ratio, and average mass of the resin particles can be adjusted by appropriately changing the extrusion speed, take-up speed, cutter speed, and the like when the resin melt-kneaded product is extruded.

As a dispersion medium (specifically, a liquid) for dispersing the resin particles obtained as described above in a sealed container, an aqueous dispersion medium is used. The aqueous dispersion medium is a dispersion medium (specifically, a liquid) containing water as a main component. A proportion of water in the aqueous dispersion medium is preferably 60 mass % or more, more preferably 70 mass % or more, and still more preferably 80 mass % or more.

Examples of the aqueous dispersion medium other than water include ethylene glycol, glycerin, methanol, and ethanol.

To the core layer of the resin particle, an additive such as a cell adjusting agent, a crystal nucleating agent, a colorant, a flame retardant, a flame retardant aid, a plasticizer, an antistatic agent, an antioxidant, an ultraviolet inhibitor, a light stabilizer, a conductive filler, or an antibacterial agent can be added as necessary. Examples of the cell adjusting agent include: inorganic powders such as talc, mica, zinc borate, calcium carbonate, silica, titanium oxide, gypsum, zeolite, borax, aluminum hydroxide, and carbon; and organic powders such as a phosphoric acid-based nucleating agent, a phenolic nucleating agent, an amine-based nucleating agent, and a polyfluoroethylene-based resin powder. In a case where the cell adjusting agent is added, the content of the cell adjusting agent is preferably 0.01 to 1 part by mass with respect to 100 parts by mass of the polypropylene-based resin.

When the resin particles are dispersed in the dispersion medium, it is preferable to add a dispersant to the dispersion medium so that the resin particles heated in the container are not fusion-bonded to each other. The dispersant may be any dispersant as long as the dispersant prevents fusion bonding of the resin particles in the container, and can be used regardless of whether the dispersant is organic or inorganic. However, a fine particulate inorganic substance is preferable from the viewpoint of ease of handling. Examples of the dispersant include clay minerals such as amsnite, kaolin, mica, and clay. The clay mineral may be natural or synthetic. Examples of the dispersant include aluminum oxide, titanium oxide, basic magnesium carbonate, basic zinc carbonate, calcium carbonate, and iron oxide. As the dispersant, one kind or two or more kinds thereof are used. Among them, a clay mineral is preferably used as the dispersant. The dispersant is added in an amount of preferably 0.001 to 5 parts by mass per 100 parts by mass of the resin particles.

Note that in a case where the dispersant is used, an anionic surfactant such as sodium dodecylbenzenesulfonate, sodium alkylbenzenesulfonate, sodium lauryl sulfate, or sodium oleate is preferably used in combination as a dispersion aid. An addition amount of the dispersion aid is preferably 0.001 to 1 part by mass per 100 parts by mass of the resin particles.

In the first expanding step, the resin particles in the dispersion medium are impregnated with an inorganic physical blowing agent in the sealed container. Next, the resin particles are released from the sealed container to a lower pressure environment than the pressure in the sealed container. Thereby, first-step expanded beads having the bulk ratio of $M_1$ are obtained.

Examples of the inorganic physical blowing agent for expanding the resin particles include carbon dioxide, air, nitrogen, helium, and argon. From the viewpoint of environmental load and handleability, carbon dioxide is preferably used.

An addition amount of the blowing agent with respect to 100 parts by mass of the resin particles is preferably 0.1 to 30 parts by mass, and more preferably 0.5 to 15 parts by mass.

As a method for impregnating the resin particles with the blowing agent in the step of producing expanded beads, a method is preferably used in which resin particles are dispersed in an aqueous dispersion medium in a sealed container and a blowing agent is injected while heating to impregnate the resin particles with the blowing agent.

The pressure in the sealed container during expanding is preferably 0.5 MPa (G: gauge pressure) or more. On the other hand, the pressure in the sealed container is preferably 4.0 MPa (G) or less. Within the above range, expanded beads can be produced safely without the risk of breakage, explosion, or the like of the sealed container.

When the temperature of the aqueous dispersion medium is raised at 1 to 5 °C/min in the first expanding step, a temperature at the time of expanding can also be in an appropriate range.

The expanded bead having a crystal structure in which a melting peak (that is, an intrinsic peak) unique to the polypropylene-based resin constituting the foamed layer and one or more melting peaks (that is, a high-temperature peak) on a high temperature side thereof appear in a DSC curve obtained by differential scanning calorimetry (DSC) are obtained as follows, for example.

During heating in the first expanding step, a first holding step of holding at a temperature of (the melting point of the polypropylene-based resin−20 °C) or higher and lower than (the melting end temperature of the polypropylene-based resin) for a sufficient time, preferably about 10 to 60 minutes is performed. Thereafter, the temperature is adjusted to a temperature from (the melting point of the polypropylene-based resin−15 °C) to lower than (the melting end temperature of the polypropylene-based resin+10 °C). Then, if necessary, a second holding step of holding at that temperature for a more sufficient time, preferably about 10 to 60 minutes is performed. Next, by releasing the expandable resin particles containing the blowing agent from the inside of the sealed container into a low pressure environment to expand the expandable resin particles, expanded beads having the above-described crystal structure can be obtained. The expanding is preferably performed in the sealed container at (the melting point of the polypropylene-based resin−10 °C) or higher, and more preferably performed at (the melting point of the polypropylene-based resin) or higher and (the melting point of the polypropylene-based resin+20 °C) or lower.

In the first expanding step, when the resin particles are released from the sealed container into a low-pressure atmosphere (usually under atmospheric pressure), cell structures are formed in the resin particles, and the resin particles are cooled by being exposed to the outside air, so that the cell structures are stabilized, and first-step expanded beads are obtained. From the viewpoint of improving productivity and reducing environmental load, it is preferable not to adjust the temperature of the atmosphere into which the resin particles are released. The temperature of the atmosphere into which the resin particles are released is preferably lower than 80 °C. The resulting first-step expanded beads can be dried by being left to stand for 12 hours or longer under an atmosphere of, for example, 23 °C and 50%.

Conventionally, in a case where a temperature Tu of the atmosphere into which the resin particles are released is low, the blackness of the resulting expanded beads tends to be low, and it has been difficult to obtain a lightweight molded article having high blackness. On the other hand, according to the production method of the present disclosure, the blackness of the finally obtained molded article can be increased even in a case where the temperature Tu of the atmosphere into which the resin particles are released is adjusted to a low temperature of, for example, less than 80 °C. From the viewpoint of suppressing excessive reduction in the blackness of the first-step expanded beads, the temperature Tu of the atmosphere into which the resin particles are released is preferably 40 °C or higher, and more preferably 60 °C or higher.

From the viewpoint of further increasing the blackness of the first-step expanded beads and from the viewpoint of further suppressing the adhesion and shrinkage of the first-step expanded beads, a difference [Tmc−Tu] between the melting point Tmc of the polypropylene-based resin constituting the resin particles and the temperature Tu of the atmosphere into which the resin particles are released is preferably 65 °C or more and 85 °C or less.

In the second expanding step, an internal pressure is applied to the first-step expanded beads, and the first-step expanded beads are heated. As a result, the first-step expanded beads are further expanded to obtain polypropylene-based resin expanded beads (that is, the second-step expanded beads) having the bulk ratio of $M_2$. Specifically, the second expanding step is performed, for example, as follows. First, the first-step expanded beads are placed in a pressure-resistant container. An internal pressure is applied to the first-step expanded beads in the pressure-resistant container, and the pressure in the cells of the first-step expanded beads is increased to the atmospheric pressure or higher. Next, the first-step expanded beads are taken out from the pressure-resistant container, and the first-step expanded beads are further expanded by heating the first-step expanded beads under a pressure lower than the pressure in the cells of the first-step expanded beads described above. In this way, the second-step expanded beads are obtained. Examples of the method for applying an internal pressure to the first-step expanded beads include a method of impregnating the beads with an inorganic gas. As the inorganic gas, air, carbon dioxide, or the like is used. A heating medium such as steam or heated air is used for heating.

In the second expanding step, the internal pressure applied to the first-step expanded beads is preferably the atmospheric pressure or higher, preferably 0.1 MPa (G) or higher, more preferably 0.2 MPa (G) or higher, and still more preferably 0.3 MPa (G) or higher from the viewpoint of easily obtaining the second-step expanded beads having the predetermined bulk ratio $M_2$. On the other hand, the upper limit of the internal pressure applied to the first-step expanded beads is about 1 MPa (G).

In the second expanding step, the heating time of the first-step expanded beads is preferably in a range of 3 seconds or longer and 60 seconds or shorter from the viewpoint of easily obtaining the second-step expanded beads having the predetermined bulk ratio $M_2$ while suppressing blocking between the first-step expanded beads. From the same viewpoint, the temperature of the heating medium is preferably in a range of 80 °C or higher and 120 °C or lower.

A molded article can be obtained by in-mold molding of the expanded beads (second-step expanded beads) obtained as described above (that is, the in-mold molding method). The in-mold molding method is performed by filling expanded beads in a mold and heat-molding the expanded beads using a heating medium such as steam.

Specifically, after expanded beads are filled in a mold, a heating medium such as steam is introduced into the mold, whereby the expanded beads are heated to be secondarily expanded, and are mutually fusion-bonded to obtain a molded article to which the shape of the molding space is imparted.

The method for producing expanded beads of the present disclosure only needs to include at least a first expanding step and a second expanding step as the expanding step, and may include third or subsequent expanding steps to obtain expanded beads having a higher bulk ratio.

From the viewpoint that the dimensional change can be further sufficiently suppressed even when the aging step is omitted, a voidage of the molded article is preferably 4% or more, more preferably 4.5% or more, and still more preferably 5% or more. On the other hand, from the viewpoint of further improving the rigidity and the surface property, the voidage of the molded article is preferably 15% or less, and more preferably 12% or less.

The voidage of the molded article is measured and calculated, for example, as follows. Specifically, first, a test piece having a rectangular parallelepiped shape (20 mm long×100 mm wide×20 mm high) is cut out from the central portion of the molded article. Next, the test piece is immersed in a measuring cylinder containing ethanol, and a true volume Vc (L) of the test piece is determined from the increase in the liquid level of ethanol. In addition, an apparent volume Vd (L) is determined from the outer dimension of the test piece. The voidage of the molded article can be determined from the determined true volume Vc and the apparent volume Vd by the following equation (III).

$$\text{Voidage (\%)} = [(Vd - Vc)/Vd] \times 100 \quad \text{(III)}$$

A density of the molded article is preferably 10 kg/m$^3$ or more and 100 kg/m$^3$ or less. In this case, the lightweight property and the rigidity of the molded article can be improved in a well-balanced manner. From the viewpoint of further improving the rigidity of the molded article, the density of the molded article is more preferably 20 kg/m$^3$ or more, and still more preferably 25 kg/m$^3$ or more. From the viewpoint of further improving the lightweight property, the density of the molded article is more preferably 80 kg/m$^3$ or less, and still more preferably 50 kg/m$^3$ or less. The density of the molded article is calculated by dividing the weight (g) of the molded article by the volume (L) determined from the outer dimension of the molded article and performing unit conversion. Note that for example, in a case where the molded article has a complicated shape at least partially, and it is not easy to determine the volume from the outer dimension of the molded article, the volume of the molded article can be determined by a submersion method.

The molded article is also used as a sound absorbing material, an impact absorbing material, a cushioning material, and the like in various fields such as a vehicle field including an automobile and a building field.

EXAMPLES

The following physical properties were measured and evaluated for resins, expanded beads, and molded articles used in Examples and Comparative Examples. Note that measurement and evaluation of physical properties of expanded beads were performed after allowing the expanded beads to stand for 24 hours under conditions of a relative humidity of 50%, 23 °C, and 1 atm to be conditioned. Measurement and evaluation of physical properties of molded articles were performed using the molded articles conditioned by allowing the molded articles after the aging step to stand for 24 hours under conditions of a relative humidity of 50%, 23 °C, and 1 atm.

<Polypropylene-Based Resin>

Table 1 shows properties and the like of the polypropylene-based resins used for producing the expanded beads. Note that both the ethylene-propylene copolymer and the ethylene-propylene-butene copolymer used in the present Examples are random copolymers. These copolymers are polypropylene-based resins containing a propylene component as a main component. A polypropylene-based resin density of each of PP1 and PP2 is 900 kg/m$^3$.

TABLE 1

| Symbol | Type | Comonomer | Flexural modulus (MPa) | Melting point (° C.) | MFR (g/10 min) |
|---|---|---|---|---|---|
| PP1 | Ethylene-propylene random copolymer | Ethylene 1.4 mass % | 1470 | 153 | 7 |
| PP2 | Ethylene-propylene random copolymer | Ethylene 3.1 mass % | 980 | 142 | 8 |
| PP3 | Ethylene-propylene-butene copolymer | Ethylene 3.1 mass %, butene 3.8 mass % | 650 | 134 | 6 |

(Flexural Modulus of Polypropylene-Based Resin)

The polypropylene-based resin was heat-pressed at 230 °C to prepare a 4 mm sheet, and a test piece having a length of 80 mm× a width of 10 mm×a thickness of 4 mm was cut out from the sheet. The flexural modulus of this test piece was determined in accordance with JIS K 7171:2008.

Note that a radius R1 of an indenter and a radius R2 of a support base are both 5 mm, an inter-fulcrum distance is 64 mm, and a test speed is 2 mm/min.

(Melting Point of Polypropylene-Based Resin)

A melting point of the polypropylene-based resin was determined on the basis of JIS K 7121:1987. Specifically, "(2) The case of measurement of melting temperature after a definite heat treatment" was adopted as the conditioning, a DSC curve was obtained by raising the temperature of the conditioned test piece from 30 °C to 200 °C at a heating rate of 10 °C/min, and a vertex temperature of the melting peak was taken as the melting point. Note that as the measuring apparatus, a heat flux differential scanning calorimeter (manufactured by SII NanoTechnology Inc., model number: DSC 7020) was used.

(Melt Flow Rate of Polypropylene-Based Resin)

A melt flow rate (that is, MFR) of the polypropylene-based resin was measured under conditions of a temperature of 230 °C and a load of 2.16 kg in accordance with JIS K 7210-1:2014.

Tables 2 and 3 show properties and the like of the multilayer resin particles and the expanded beads. Note that in the tables, carbon black is denoted as "CB".

TABLE 2

| Example, Comparative Example No. | | | Unit | Example 1 | Example 2 | Example 3 | Example 4 | Example 5 | Example 6 |
|---|---|---|---|---|---|---|---|---|---|
| Resin particles | Core layer | Base material resin | — | PP1 | PP1 | PP2 | PP1 | PP1 | PP1 |
| | | Blending amount of CB | wt % | 2.7 | 2.7 | 2.7 | 1.5 | 4.5 | 2.7 |
| | Cover layer | Base material resin | — | PP3 | PP3 | PP3 | PP3 | PP3 | PP3 |
| | | Blending amount of CB | wt % | 2.7 | 2.7 | 2.7 | 1.5 | 4.5 | 2.7 |
| First expanding step | Expanding temperature | | ° C. | 159.1 | 158.6 | 150.1 | 159.1 | 159.1 | 158.8 |
| | Carbon dioxide pressure | | MPa(G) | 2.2 | 3.0 | 2.6 | 1.8 | 2.3 | 2.6 |
| | Bulk ratio $M_1$ of first-step expanded beads | | Times | 15.0 | 24.5 | 15.2 | 10.2 | 15.1 | 20.3 |
| | Circularity of through-hole of first-step expanded bead | | — | 0.97 | 0.97 | 0.97 | 0.97 | 0.96 | 0.97 |
| Second expanding step | Internal pressure | | MPa(G) | 0.5 | 0.5 | 0.5 | 0.5 | 0.5 | 0.5 |
| | Drum pressure | | MPa(G) | 0.07 | 0.05 | 0.06 | 0.05 | 0.075 | 0.065 |
| | Bulk ratio $M_2$ of second-step expanded beads | | Times | 35.6 | 36.0 | 36.1 | 20.0 | 36.1 | 44.6 |
| Ratio of bulk ratios $M_2/M_1$ | | | — | 2.37 | 1.47 | 2.38 | 1.96 | 2.39 | 2.19 |
| Expanded beads | Blending amount of CB | | wt % | 2.7 | 2.7 | 2.7 | 1.5 | 4.5 | 2.7 |
| | Bulk ratio | | Times | 35.6 | 36.0 | 36.1 | 20.0 | 36.1 | 44.6 |
| | Bulk density | | kg/m$^3$ | 25.3 | 25.0 | 24.9 | 45.1 | 24.9 | 20.2 |
| | Apparent density | | kg/m$^3$ | 45.0 | 44.9 | 45.1 | 81.2 | 45.0 | 36.2 |
| | Apparent density/bulk density | | — | 1.78 | 1.80 | 1.81 | 1.80 | 1.81 | 1.79 |
| | Closed cell content | | % | 97 | 96 | 98 | 98 | 98 | 97 |
| | Heat of fusion of high-temperature peak | | J/g | 15.3 | 15.2 | 14.5 | 15.4 | 14.7 | 15.2 |
| | Average hole diameter d of through-holes | | mm | 0.70 | 0.71 | 0.73 | 0.51 | 0.80 | 0.97 |
| | Average outer diameter D | | mm | 3.70 | 3.69 | 3.72 | 3.08 | 3.66 | 3.99 |
| | d/D | | — | 0.19 | 0.19 | 0.20 | 0.16 | 0.22 | 0.24 |
| | Average wall thickness t | | mm | 1.50 | 1.49 | 1.50 | 1.29 | 1.43 | 1.51 |
| | t/D | | — | 0.41 | 0.40 | 0.40 | 0.42 | 0.39 | 0.38 |

TABLE 3

| Example, Comparative Example No. | | | Unit | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|
| Resin particles | Core layer | Base material resin | — | PP1 | PP1 | PP2 | PP1 | PP1 | PP2 | PP1 | PP1 |
| | | Blending amount of CB | wt % | 2.7 | 2.7 | 2.7 | 10 | 1.5 | 2.7 | 4.5 | 2.7 |
| | Cover layer | Base material resin | — | PP3 | PP3 | PP3 | PP3 | PP3 | PP3 | PP3 | PP3 |
| | | Blending amount of CB | wt % | 2.7 | 2.7 | 2.7 | 10 | 1.5 | 2.7 | 4.5 | 2.7 |

TABLE 3-continued

| Example, Comparative Example No. | | Unit | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| First expanding step | Expanding temperature | ° C. | 157.2 | 157.2 | 148.2 | 157.2 | 158.8 | 150.5 | 159 | 157.2 |
| | Carbon dioxide pressure | MPa(G) | 3.8 | 3.5 | 3.9 | 4.0 | 2.5 | 1.8 | 2.4 | 3.5 |
| | Bulk ratio $M_1$ of first-step expanded beads | Times | 35.7 | 29.9 | 36.0 | 35.9 | 20.0 | 10.1 | 15.2 | 30.5 |
| | Circularity of through-hole of first-step expanded bead | — | 0.96 | 0.96 | 0.97 | 0.96 | 0.96 | 0.97 | — | 0.96 |
| Second expanding step | Internal pressure | MPa(G) | — | 0.2 | — | — | — | 0.5 | 0.5 | 0.5 |
| | Drum pressure | MPa(G) | — | 0.03 | — | — | — | 0.085 | 0.07 | 0.05 |
| | Bulk ratio $M_2$ of second-step expanded beads | Times | — | 35.6 | — | — | — | 36.0 | 35.7 | 44.8 |
| Ratio of bulk ratios $M_2/M_1$ | | — | — | 1.19 | — | — | — | 3.56 | 2.35 | 1.47 |
| Expanded beads | Blending amount of CB | wt % | 2.7 | 2.7 | 2.7 | 10.0 | 1.5 | 2.7 | 4.5 | 2.7 |
| | Bulk ratio | Times | 35.7 | 35.6 | 36.0 | 35.9 | 20.0 | 36.0 | 35.7 | 44.8 |
| | Bulk density | $kg/m^3$ | 25.2 | 25.3 | 25.0 | 25.1 | 44.9 | 25.0 | 25.2 | 20.1 |
| | Apparent density | $kg/m^3$ | 44.9 | 45.1 | 45.0 | 45.2 | 81.0 | 45.2 | 40.3 | 36.0 |
| | Apparent density/bulk density | — | 1.78 | 1.78 | 1.80 | 1.80 | 1.80 | 1.81 | 1.60 | 1.79 |
| | Closed cell content | % | 85 | 95 | 93 | 85 | 95 | 85 | 94 | 96 |
| | Heat of fusion of high-temperature peak | J/g | 15.1 | 14.9 | 14.7 | 14.4 | 15.4 | 14.9 | 15.0 | 14.9 |
| | Average hole diameter d of through-holes | mm | 0.78 | 0.70 | 0.72 | 0.69 | 0.51 | 0.80 | — | 0.97 |
| | Average outer diameter D | mm | 3.67 | 3.70 | 3.68 | 3.69 | 3.08 | 3.70 | 3.70 | 3.99 |
| | d/D | — | 0.21 | 0.19 | 0.20 | 0.19 | 0.16 | 0.22 | — | 0.24 |
| | Average wall thickness t | mm | 1.45 | 1.50 | 1.48 | 1.50 | 1.29 | 1.45 | — | 1.51 |
| | t/D | — | 0.39 | 0.41 | 0.40 | 0.41 | 0.42 | 0.39 | — | 0.38 |

(Maximum Length Lr of Multilayer Resin Particles)

The maximum length of the multilayer resin particles was determined as follows. Maximum lengths of 100 multilayer resin particles randomly selected from the multilayer resin particle group were measured with a vernier caliper, and the arithmetic average thereof was taken as the maximum length of the multilayer resin particles.

(Average Hole Diameter Dr of Through-Holes of Multilayer Resin Particles)

The average hole diameter of the through-holes of the multilayer resin particles was determined as follows. 100 multilayer resin particles randomly selected from the multilayer resin particle group were cut perpendicularly to the penetration direction of each of the through-holes at a position where the area of the cut surface was substantially maximum. A photograph of the cut surface of each multilayer resin particle was taken, and the cross-sectional area (opening area) of the through-hole portion in the cross-sectional photograph was determined. A diameter of a virtual perfect circle having the same area as the cross-sectional area was calculated, and the arithmetic average thereof was taken as the average hole diameter (dr) of the through-holes of the multilayer resin particles.

(Average Outer Diameter Dr of Multilayer Resin Particles)

The average outer diameter of the multilayer resin particles was determined as follows. 100 multilayer resin particles randomly selected from the multilayer resin particle group were cut perpendicularly to the penetration direction of each of the through-holes at a position where the area of the cut surface was substantially maximum. A photograph of the cut surface of each multilayer resin particle was taken, and the cross-sectional area (also including the opening area of the through-hole) of the multilayer resin particle was determined. A diameter of a virtual perfect circle having the same area as the cross-sectional area was calculated, and the arithmetic average thereof was taken as the average outer diameter (Dr) of the multilayer resin particles.

(Circularity of Through-Hole of First-Step Expanded Bead)

The circularity of the through-hole of the first-step expanded bead was determined as follows. 50 first-step expanded beads randomly selected from the expanded bead group of the first-step expanded beads were cut perpendicularly to the penetration direction of each of the through-holes at a position where the area of the cut surface was substantially maximum. A photograph of the cut surface of each first-step expanded bead was taken, and a cross-sectional area S (specifically, an opening area) and a peripheral length C (that is, a circumference of the opening) of a through-hole portion were determined. The circularity was determined by the following equation (a).

$$\text{Circularity} = 4\pi S/(C \times C) \qquad (\alpha)$$

Here, π means a circular constant.

(Average Hole Diameter d of Through-Holes)

The average hole diameter of the through-holes of the expanded beads was determined as follows. 100 expanded beads randomly selected from the expanded bead group after conditioning were cut perpendicularly to the penetration direction of each of the through-holes at a position where the area of the cut surface was substantially maximum. A photograph of the cut surface of each expanded bead was taken, and the cross-sectional area (opening area) of the through-hole portion in the cross-sectional photograph was determined. A diameter of a virtual perfect circle having the same area as the cross-sectional area was calculated, and the arithmetic average thereof was taken as the average hole diameter (d) of the through-holes of the expanded beads.

(Average Outer Diameter D)

The average outer diameter of the expanded beads was determined as follows. 100 expanded beads randomly selected from the expanded bead group after conditioning were cut perpendicularly to the penetration direction of each of the through-holes at a position where the area of the cut surface was substantially maximum. A photograph of the cut surface of each expanded bead was taken, and the cross-sectional area (also including the opening area of the through-hole) of the expanded bead was determined. A diameter of a virtual perfect circle having the same area as the cross-sectional area was calculated, and the arithmetic average thereof was taken as the average outer diameter (D) of the expanded beads.

(Average Wall Thickness t)

The average wall thickness of the expanded beads was determined by the following equation (IV).

$$\text{Average wall thickness } t = (\text{average outer diameter } D - \text{average hole diameter } d)/2 \quad \text{(IV)}$$

(Bulk Density)

The bulk density of the expanded beads was determined as follows. Expanded beads were randomly taken out from the expanded bead group and placed in a measuring cylinder having a volume of 1 L, a large number of the expanded beads were accommodated up to a scale of 1 L so as to be in a natural deposition state, a mass W2 [g] of the accommodated expanded beads was divided by an accommodation volume V2 (1 L) (W2/V2), and the unit was converted to [kg/m$^3$], whereby the bulk density of the expanded beads was obtained.

(Bulk Ratio $M_1$, Bulk Ratio $M_2$)

The bulk ratio $M_1$ of the first-step expanded beads was determined and calculated as follows. First, the bulk density of the first-step expanded beads was calculated by the above method using the first-step expanded beads after conditioning. Next, the bulk ratio $M_1$ [times] of the first-step expanded beads was determined by dividing the density [kg/m$^3$] of the polypropylene-based resin constituting the foamed layer of the first-step expanded beads by the bulk density [kg/m$^3$] of the first-step expanded beads. Note that the bulk ratio $M_2$ of the second-step expanded beads was also measured and calculated in the same manner as in the above method except that the second-step expanded beads were used instead of the first-step expanded beads.

(Apparent Density)

The apparent density of the expanded beads was determined as follows. First, a measuring cylinder containing ethanol at a temperature of 23 °C was prepared, and an arbitrary amount of the expanded bead group (mass W1 [g] of the expanded bead group) after conditioning was immersed in ethanol in the measuring cylinder using a wire mesh. Then, in consideration of the volume of the wire mesh, a volume V1 of the expanded bead group read from the water level rise was measured. The apparent density of the expanded beads was calculated by dividing the mass W1 [g] of the expanded bead group placed in the measuring cylinder by the volume V1 [L] (W1/V1) and then converting the unit to [kg/m$^3$].

(Closed Cell Content)

The closed cell content of the expanded beads was measured using an air-comparison pycnometer on the basis of ASTM-D 2856-70 Procedure C. Specifically, it was determined as follows. Using expanded beads having a bulk volume of about 20 cm$^3$ after conditioning as a measurement sample, an apparent volume Va was accurately measured by an ethanol immersion method as described below. After the measurement sample whose apparent volume Va was measured was sufficiently dried, a true volume value Vx of the measurement sample measured by AccuPyc II 1340 manufactured by Shimadzu Corporation was measured in accordance with Procedure C described in ASTM-D 2856-70. Then, based on these volume values Va and Vx, the closed cell content was calculated by the following equation (V), and the average value of five samples (N=5) was taken as the closed cell content of the expanded beads.

$$\text{Closed cell content (\%)} = (Vx - W/\rho)\times 100/(Va - W/\rho) \quad \text{(V)}$$

Vx: a true volume of the expanded bead measured by the above method, that is, a sum of a volume of the resin constituting the expanded bead and a total cell volume of closed cell portions in the expanded beads (unit: cm$^3$)

Va: an apparent volume of the expanded bead measured from an increase in the liquid level when the expanded beads is immersed in a measuring cylinder containing ethanol (unit: cm$^3$)

W: a weight of the measurement sample of the expanded beads (unit: g)

ρ: a density of the resin constituting the expanded beads (unit: g/cm$^3$)

(Heat of Fusion of High-Temperature Peak of Expanded Bead)

One expanded bead was collected from the expanded bead group after conditioning. Using the expanded bead as a test piece, a DSC curve was obtained when the test piece was heated from 23 °C to 200 °C at a heating rate of 10 °C/min by a differential scanning calorimeter (specifically, DSC Q1000 manufactured by TA Instruments). In the DSC curve, the area of the high-temperature peak was determined and taken as the heat of fusion of the high-temperature peak.

The above measurement was performed on five expanded beads, and the arithmetic average value was shown in Tables 2 and 3.

(Possible Range for Molding with Aging)

First, a molded article was produced by changing a molding steam pressure by 0.02 MPa between 0.20 to 0.38 MPa (G) in the method of <Production of molded article> described below. Note that before molding, the expanded beads were subjected to pretreatment pressurization by applying an internal pressure of 0.1 MPa (G), and molding was performed with a cracking amount set to 10% (that is, 6 mm). After demolding, the molded article was allowed to stand in an oven at 80 °C for 12 hours. The aging step is a step of allowing the molded article to stand in an oven at 80 °C for 12 hours. After the aging step, the molded article was conditioned by allowing the molded article to stand for 24 hours under conditions of a relative humidity of 50%, 23 °C, and 1 atm. Next, the fusion-bondability and recoverability (specifically, recoverability of expansion or shrinkage after in-mold molding) of the molded article were evaluated. As a result, the steam pressure (that is, a steam pressure at which a passed product was acquirable) at which the molded article passed all the items in the evaluation criteria described below was set as the moldable steam pressure with aging. Note that the lower the moldable steam pressure with aging and the wider the range, the better the moldability.

(Possible Range for Molding Molded Article Having Good Color Density and Color Unevenness)

The color density and color unevenness of the molded article after conditioning obtained in the evaluation of (Possible range for molding with aging) were evaluated. As a result, the steam pressure evaluated as "A" in any item according to the evaluation criteria described below was set to a steam pressure at which a molded article having good color density and color unevenness can be molded.

(Possible Range for Molding without Aging)

A molded article was produced in the same manner as in the above (Possible range of molding with aging) except that the aging step of allowing the molded article to stand in a high-temperature atmosphere adjusted to a temperature of 80 °C for 12 hours after demolding was not performed, and the fusion-bondability and recoverability of the molded article were evaluated. As a result, a case where a passed product was obtained at any molding steam pressure was evaluated as "o", and a case where a passed product was not obtained at any molding steam pressure was evaluated as "x".

(Fusion-Bondability)

A molded article was bent and broken, the number C1 of expanded beads present on the fracture surface and the number C2 of broken expanded beads were determined, and a ratio of the number of broken expanded beads to the number of expanded beads present on the fracture surface (that is, a material fracture rate) was calculated. The material fracture rate is calculated from the formula $C2/C1\times100$. The above measurement was performed five times using different test pieces, and the material fracture rate was obtained for each time. When the arithmetic average value of the material fracture rates was 90% or more, it was defined as pass.

(Recoverability)

In a molded article obtained using a flat plate-shaped die having a length of 300 mm, a width of 250 mm, and a thickness of 60 mm, thicknesses near four corners (specifically, 10 mm inside from the corners in the center direction) and a thickness at the center (a portion equally dividing the molded article into two in both longitudinal direction and lateral direction) were measured. Next, a ratio (unit: %) of the thickness of the thinnest portion to the thickness of the thickest portion among the measured portions was calculated, and when the ratio was 95% or more, it was evaluated as pass.

<Molded Article>

Tables 4 and 5 show properties and the like of the molded articles of Examples and Comparative Examples.

TABLE 4

| Example, Comparative Example No. | | Unit | Example 1 | Example 2 | Example 3 | Example 4 | Example 5 | Example 6 |
|---|---|---|---|---|---|---|---|---|
| Molded article (moldability) | Possible range for molding with aging | MPa(G) | 0.22 to 0.38 | 0.22 to 0.38 | 0.22 to 0.34 | 0.22 to 0.38 | 0.22 to 0.38 | 0.22 to 0.36 |
| | Possible range for molding molded article having good color density and color unevenness | MPa(G) | 0.22 to 0.38 | 0.22 to 0.38 | 0.22 to 0.34 | 0.22 to 0.38 | 0.22 to 0.38 | 0.22 to 0.36 |
| | Possibility of molding without aging | — | ○ | ○ | ○ | ○ | ○ | ○ |
| | Water cooling time | s | 0 | 0 | 0 | 0 | 0 | 0 |
| Molded article (physical properties, evaluation) | Molding pressure | MPa(G) | 0.22 | 0.22 | 0.22 | 0.22 | 0.22 | 0.22 |
| | Density of molded article | kg/m$^3$ | 32 | 31 | 31 | 50 | 31 | 23 |
| | 50% compressive strength | kPa | 248 | 235 | 220 | 420 | 240 | 175 |
| | Voidage | % | 10 | 11 | 12 | 11 | 10 | 11 |
| | Surface property | — | A | A | A | A | A | A |
| | L* value | — | 20.4 | 22.1 | 20.2 | 22.0 | 19.9 | 21.3 |
| | Color density | — | A | A | A | A | A | A |
| | Color unevenness | — | A | A | A | A | A | A |

TABLE 5

| Example, Comparative Example No. | | Unit | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Molded article (moldability) | Possible range for molding with aging | MPa(G) | 0.22 to 0.38 | 0.22 to 0.38 | 0.22 to 0.32 | 0.30 to 0.32 | 0.22 to 0.38 | Not evaluated | 0.32 to 0.36 | 0.22 to 0.36 |
| | Possible range for molding molded article having good color density and color unevenness | MPa(G) | None | None | None | 0.30 to 0.32 | None | | 0.32 to 0.36 | None |
| | Possibility of molding without aging | — | ○ | ○ | ○ | ○ | ○ | ○ | X | ○ |
| | Water cooling time | s | 0 | 0 | 0 | 50 | 0 | | 100 | 0 |
| Molded article (physical properties, evaluation) | Molding pressure | MPa(G) | 0.22 | 0.22 | 0.22 | 0.30 | 0.22 | Not evaluated | 0.32 | 0.22 |
| | Density of molded article | kg/m$^3$ | 31 | 31 | 32 | 32 | 50 | | 31 | 23 |
| | 50% compressive strength | kPa | 240 | 238 | 222 | 215 | 414 | | 243 | 176 |
| | Voidage | % | 12 | 11 | 12 | 11 | 13 | | — | 11 |
| | Surface property | — | A | A | A | A | A | | A | A |
| | L* value | — | 29.8 | 26.1 | 29.9 | 20.0 | 25.4 | | 20.0 | 27.0 |
| | Color density | — | C | B | C | A | B | | A | B |
| | Color unevenness | — | C | B | C | A | B | | A | B |

(Pretreatment Pressurization Step)

The pretreatment pressurization was performed by placing expanded beads in a sealed container, pressurizing the expanded beads with compressed air, and applying an internal pressure of 0.1 MPa (G) to the expanded beads. Note that the internal pressure of the expanded beads is a value measured as follows. The internal pressure P (MPa (G)) of the expanded beads was calculated by the equation P=(W+M)×R×T+V, where Q (g) was the weight of the expanded bead group in a state where the internal pressure was increased immediately before being filled into a mold, U (g) was the weight of the expanded bead group after a lapse of 48 hours, and the difference between the weights Q (g) and U (g) was an increased air amount W (g). In the equation, M represents a molecular weight of air, R represents a gas constant, T represents an absolute temperature, V represents a volume (L) obtained by subtracting a volume of the base material resin in the expanded bead group from an apparent volume of the expanded bead group, and in the present Examples, M=28.8 (g/mol), R=0.0083 (MPa L/(K mol)), and T=296 (K).

<Density of Molded Article>

A density (kg/m$^3$) of the molded article was calculated by dividing the weight (g) of the molded article by the volume (L) obtained from the outer dimension of the molded article and performing unit conversion.

(50% Compressive Stress)

A test piece having a length of 50 mm×a width of 50 mm×a thickness of 25 mm was cut out from the central portion of the molded article in such a manner that a skin layer on the surface of the molded article was not included in the test piece. On the basis of JIS K 6767:1999, a 50% compressive stress of the molded article was determined by performing a compression test at a compression rate of 10 mm/min.

(Voidage of Molded Article)

A voidage of the molded article was determined as follows. A test piece having a rectangular parallelepiped shape of 20 mm long×100 mm wide×20 mm high was cut out from the central portion of the molded article. The test piece was immersed in a measuring cylinder containing ethanol, and a true volume Vc (L) of the test piece was determined from the increase in the liquid level of ethanol. In addition, an apparent volume Vd (L) was obtained from the outer dimension of the test piece. The voidage of the molded article was determined from the determined true volume Vc and the apparent volume Vd by the following equation (VI).

$$\text{Voidage (\%)} = \left[(Vd - Vc)/Vd\right] \times 100 \tag{VI}$$

(Surface Property)

The surface of the molded article was observed, and the surface property was evaluated on the basis of the following criteria.

A: A good surface state in which there are a sufficiently small number of gaps between beads on the surface of the molded article and irregularities caused by the through-holes and the like are not noticeable is exhibited.

B: Irregularities caused by gaps between beads and/or through-holes are slightly observed on the surface of the molded article.

C: Irregularities caused by gaps between beads and/or through-holes are remarkably observed on the surface of the molded article.

(L* Value)

Five sites were randomly selected from the surface of the molded article, an L* value was measured using a spectral color difference meter ("SE 2000" manufactured by Nippon Denshoku Industries Co., Ltd.), and the arithmetic average value thereof was taken as the L* value of the molded article. Note that the measurement range was set to 30 mmΦ, and the measurement method was a reflection method.

(Color Density)

A color density of the molded article was evaluated from the L* value of the molded article according to the following criteria. Note that the L* value is an index of brightness, and the lower the L* value, the higher the blackness, and the denser the black color.

A: L* value is less than 24

B: L* value is 24 or more and less than 28

C: L* value is 28 or more (Color Unevenness)

Color unevenness was visually evaluated by five-grade evaluation from (5 points) in which there was no color unevenness on the surface of the molded article and uniform black color was exhibited to (1 point) in which there was significant color unevenness and a gray portion was observed in some places, and the color unevenness of the molded article of expanded beads was evaluated according to the following criteria based on the average value of the evaluations of five viewers.

A: 4 or more points

B: 3 or more and less than 4 points

C: Less than 3 points

Example 1

<Production of Polypropylene-Based Expanded Beads>

PP1 and carbon black shown in Table 1 were melt-kneaded at the highest set temperature of 245 °C in an extruder for forming a core layer to obtain a resin melt-kneaded product. PP3 and carbon black shown in Table 1 were melt-kneaded at the highest set temperature of 245 °C in an extruder for forming a cover layer to obtain a resin melt-kneaded product. Next, the respective resin melt-kneaded products were extruded from the extruder for forming a core layer and the extruder for forming a cover layer from a tip of a coextrusion die having a small hole for forming a through-hole. At the time, the melt-kneaded products were joined in the die to form a composite of a sheath-core type including a tubular core layer in a non-foamed state and a cover layer in a non-foamed state covering an outer surface of the core layer. The composite was extruded from a pore of a spinneret attached to the tip of the extruder into a strand shape having a tubular shape having a through-hole, and the strand-shaped product was water-cooled with cold water having a water temperature adjusted to 10 °C while the strand-shaped product was taken up, and then cut with a pelletizer to have a mass of about 1.5 mg. In this way, multilayer resin particles each including a tubular core layer having a through-hole and a cover layer covering the core layer were obtained. The maximum length Lr of the multilayer resin particles was 2 mm, the average hole diameter dr of the through-holes was 0.21 mm, and the average outer diameter Dr was 1.15 mm. A mass ratio between the core layer and the cover layer in the multilayer resin particle was set to core layer:cover layer=95:5 (that is, the mass ratio of the cover layer was 5%). Note that in the production of the multilayer resin particles, zinc borate as a cell adjusting agent was supplied to the extruder for forming a core layer, and 500 ppm by mass of zinc borate was contained in the polypropylene-based resin. Blending amounts of carbon black in the core layer and the cover layer were set to the proportions shown in Table 2.

(First Expanding Step)

1 kg of the multilayer resin particles was put in a sealed container having an internal volume of 5 L together with 3 L of water as a dispersion medium, and further 0.3 parts by mass of kaolin as a dispersant and 0.004 parts by mass of a surfactant (sodium alkylbenzene sulfonate) were added with respect to 100 parts by mass of the multilayer resin particles in the sealed container. After carbon dioxide as a blowing agent was added into the sealed container, the sealed container was sealed, and the inside of the sealed container was heated to an expanding temperature of 150.1 °C while being stirred. The pressure inside the container (that is, an impregnation pressure, a carbon dioxide pressure) at this time was 2.2 MPa (G). After holding at the same temperature (that is, 159.1 °C) for 15 minutes, the contents in the container were released into an atmosphere of the atmospheric pressure at a temperature of 75 °C to obtain first-step expanded beads. The first-step expanded beads were dried at 23 °C and 50% for 24 hours. In this way, the expanded beads having a bulk ratio of 15.0 times were obtained. Note that the temperature Tu of the atmosphere into which the resin particles were released was adjusted by introducing air for cooling into a space immediately below the sealed container.

(Second Expanding Step)

Next, the first-step expanded beads were placed in a pressure-resistant container (specifically, a pressure tank) for applying an internal pressure to the expanded beads, and air was injected into the pressure-resistant container to increase the pressure in the container, and the air was impregnated into cells to increase the internal pressure in the cells of the first-step expanded beads. The pressure (that is, the internal pressure) in the cells in the first-step expanded beads taken out from the pressure-resistant container were the value shown in Table 2. Next, the first-step expanded beads (the first-step expanded beads to which the internal pressure was applied) taken out from the pressure-resistant container were placed in another pressure-resistant container (specifically, a metal drum) for heating the expanded beads, and steam was supplied so that the pressure (that is, a drum pressure) in the pressure-resistant container was the pressure shown in Table 2 to heat the expanded beads under the atmospheric pressure. As described above, the apparent density of the first-step expanded beads was reduced to obtain black expanded beads (second-step expanded beads) having a bulk ratio of 35.6 times.

<Production of Molded Article>

Figure 6:
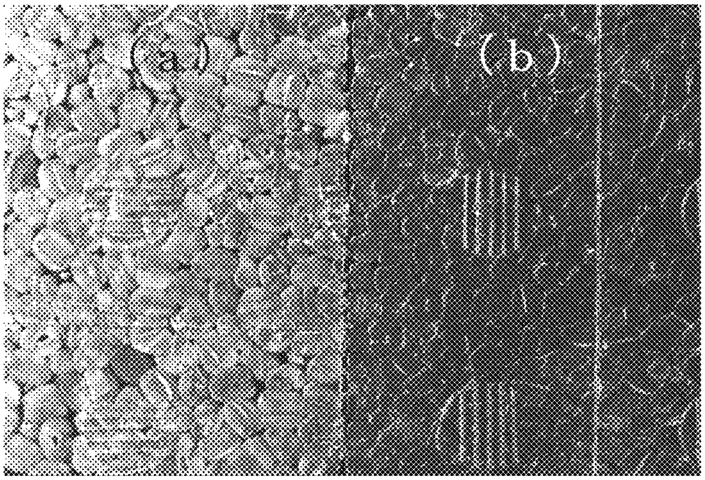
FIG. 6(*a*) is a view showing an appearance photograph of a molded article of expanded beads of Comparative Example 1, and FIG. 6(*b*) is a view showing an appearance photograph of a molded article of expanded beads of Example 1.

In production of the molded article, the second-step expanded beads dried at 23 °C for 24 hours were used. In addition, an internal pressure of 0.1 Mpa was applied to the second-step expanded beads in advance by pretreatment pressurization. Next, an exhaust step was performed in which the expanded beads were filled in a flat plate mold having a length of 300 mm×a width of 250 mm×a thickness of 60 mm and having a cracking amount adjusted to 10% (that is, 6 mm), the mold was clamped, and steam was supplied from both surfaces of the mold for 5 seconds to preheat the mold. Thereafter, steam was supplied from one surface side of the mold to perform one-side heating until a pressure lower than a predetermined molding pressure by 0.08 MPa (G) was reached. Next, steam was supplied from the other surface side of the mold to perform one-side heating until a pressure lower than the predetermined molding pressure by 0.04 MPa (G) was reached, and then heating (that is, main heating) was performed until the predetermined molding pressure was reached. After completion of the heating, the molded article was cooled with water until the surface pressure by the expanding force of the molded article reached 0.04 MPa (G), and then demolded from the mold. After demolding, the molded article was allowed to stand in an oven at 80 °C for 12 hours to be aged. After the aging step, the molded article was conditioned by allowing the molded article to stand for 24 hours under conditions of a relative humidity of 50%, 23 °C, and 1 atm. Note that the predetermined molding pressure was set as a value at which the molding pressure is the lowest among the molding pressures at which a passed product can be obtained in the evaluation of the fusion-bondability in the molding with aging described above. In the present Example, an appearance photograph of the obtained molded article is shown in FIG. 6(*b*).

Example 2

The present Example is an example in which the ratio $M_2/M_1$ of the bulk ratios was changed. Specifically, first-step expanded beads were obtained in the same manner as in Example 1 except that the conditions of the first expanding step were changed as shown in Table 2, and the bulk ratio $M_1$ of the first-step expanded beads was 24.5 times. Second-step expanded beads were produced in the same manner as in Example 1 except that these first-step expanded beads were used, the conditions of the second expanding step were changed as shown in Table 2, and the bulk ratio $M_2$ of the second-step expanded beads was 36.0 times. In addition, a molded article was obtained in the same manner as in Example 1 using these second-step expanded beads.

Example 3

The present Example is an example in which the resin forming the foamed layer was changed. Specifically, first, multilayer resin particles were prepared in the same manner as in Example 1 except that PP2 in Table 1 was used as the resin for forming the core layer. Subsequently, first-step expanded beads were obtained in the same manner as in Example 1 except that these multilayer resin particles were used, the conditions of the first expanding step were changed as shown in Table 2, and the bulk ratio $M_1$ of the first-step expanded beads was 15.2 times. Second-step expanded beads were produced in the same manner as in Example 1 except that these first-step expanded beads were used, the conditions of the second expanding step were changed as shown in Table 2, and the bulk ratio $M_2$ of the second-step expanded beads was 36.1 times. In addition, a molded article was obtained in the same manner as in Example 1 using these second-step expanded beads.

Example 4

The present Example is an example in which a molded article having a high density was produced. Specifically, second-step expanded beads were produced in the same manner as in Example 1 except that the conditions of the first expanding step and the second expanding step were changed as shown in Table 2, the bulk ratio $M_2$ of the second-step expanded beads was 20.0 times, and the blending amounts of carbon black in the core layer and the cover layer were the proportions shown in Table 2. In addition, a molded article was obtained in the same manner as in Example 1 using these second-step expanded beads.

Example 5

The present Example is an example in which the blending amount of carbon black was increased. Specifically, second-step expanded beads were produced in the same manner as in Example 1 except that the conditions of the first expanding step and the second expanding step were changed as shown in Table 2, and the blending amounts of carbon black in the core layer and the cover layer were the proportions shown in Table 2. In addition, a molded article was obtained in the same manner as in Example 1 using these second-step expanded beads.

Example 6

The present Example is an example in which a molded article having a small density was produced. Second-step expanded beads were produced in the same manner as in Example 1 except that the conditions of the first expanding step and the second expanding step were changed as shown in Table 2, and the bulk ratio $M_2$ of the second-step expanded beads was 44.6 times. In addition, a molded article was obtained in the same manner as in Example 1 using these second-step expanded beads.

Comparative Example 1

The present Example is an example in which a molded article was prepared using first-step expanded beads. Specifically, expanded beads (that is, first-step expanded beads) were produced in the same manner as in Example 1 except that in the first expanding step, the expanding conditions were changed as shown in Table 3, and expanded beads having a bulk ratio of 35.7 times were produced. The second expanding step was not performed. In addition, a molded article was obtained in the same manner as in Example 1 using these first-step expanded beads. Note that an appearance photograph of a molded article obtained in the present Example is shown in FIG. 6(*a*).

Comparative Example 2

The present Example is an example in which the bulk ratio $M_1$ is too large and the ratio $M_2/M_1$ of the bulk ratios is too small. Specifically, first-step expanded beads were obtained in the same manner as in Example 1 except that the conditions of the first expanding step were changed as shown in Table 3, and the bulk ratio $M_1$ of the first-step expanded beads was 29.9 times. Second-step expanded beads were produced in the same manner as in Example 1 except that these first-step expanded beads were used, the conditions of the second expanding step were changed as shown in Table 3, and the bulk ratio $M_2$ of the second-step expanded beads was 35.6 times. In addition, a molded article was obtained in the same manner as in Example 1 using these second-step expanded beads.

Comparative Example 3

The present Example is an example in which the resin for forming the foamed layer was changed, and a molded article was produced using first-step expanded beads. Specifically, first, multilayer resin particles were prepared in the same manner as in Example 1 except that PP2 in Table 1 was used as the resin for forming the core layer. Subsequently, expanded beads (that is, first-step expanded beads) were produced in the same manner as in Example 1 except that these multilayer resin particles were used, in the first expanding step, the expanding conditions were changed as shown in Table 3, and expanded beads having a bulk ratio of 36.0 times were produced. The second expanding step was not performed. In addition, a molded article was obtained in the same manner as in Example 1 using these first-step expanded beads.

Comparative Example 4

The present Example is an example in which the blending amount of carbon black was excessively increased, and a molded article was produced using first-step expanded beads. Specifically, first, multilayer resin particles were produced in the same manner as in Example 1 except that the blending amounts of carbon black blended in the extruder for forming a core layer and the extruder for forming a cover layer were changed as shown in Table 3. Expanded beads (that is, first-step expanded beads) were produced in the same manner as in Example 1 except that these multilayer resin particles were used, in the first expanding step, the expanding conditions were changed as shown in Table 3, and expanded beads having a bulk ratio of 35.9 times were produced. The second expanding step was not performed. In addition, a molded article was obtained in the same manner as in Example 1 using these first-step expanded beads.

Comparative Example 5

The present Example is an example in which a molded article having a large density was prepared using first-step expanded beads. Specifically, first, multilayer resin particles were produced in the same manner as in Example 1 except that the blending amounts of carbon black blended in the extruder for forming a core layer and the extruder for forming a cover layer were changed as shown in Table 3. Multilayer resin particles were prepared in the same manner as in Example 1 except that the conditions of the first expanding step were changed as shown in Table 3, and the blending amounts of carbon black in the core layer and the cover layer were the proportions shown in Table 3. Expanded beads (that is, first-step expanded beads) were produced in the same manner as in Example 1 except that these multilayer resin particles were used, in the first expanding step, the expanding conditions were changed as shown in Table 3, and expanded beads having a bulk ratio of 20.0 times were produced. The second expanding step was not performed. In addition, a molded article was obtained in the same manner as in Example 1 using these first-step expanded beads.

Comparative Example 6

The present Example is an example in which the ratio $M_2/M_1$ of the bulk ratios is too large. Specifically, first-step expanded beads were obtained in the same manner as in Example 1 except that the conditions of the first expanding step were changed as shown in Table 3, and the bulk ratio $M_1$ of the first-step expanded beads was 10.1 times. Second-step expanded beads were produced in the same manner as in Example 1 except that these first-step expanded beads were used, the conditions of the second expanding step were changed as shown in Table 3, and the bulk ratio $M_2$ of the second-step expanded beads was 36.0 times. In the second expanding step, expanded beads were fusion-bonded (blocked) with each other, and thus the molding step was not performed.

Comparative Example 7

The present Example is an example in which expanded beads having no through-hole were used. Specifically, first, multilayer resin particles were produced in the same manner as in Example 1 except that the blending amounts of carbon black blended in the extruder for forming a core layer and the extruder for forming a cover layer were changed as shown in Table 3, and multilayer resin particles having no through-hole were produced. Second-step expanded beads were produced in the same manner as in Example 1 except that these multilayer resin particles were used, and the conditions of the first expanding step were changed as shown in Table 3. In addition, a molded article was obtained in the same manner as in Example 1 using these second-step expanded beads.

Comparative Example 8

The present Example is an example in which a molded article having a small density was produced. Multilayer resin particles were produced in the same manner as in Example 1 except that the conditions of the first expanding step and the second expanding step were changed as shown in Table 3. Expanded beads (that is, first-step expanded beads) were produced in the same manner as in Example 1 except that these multilayer resin particles were used, in the first expanding step, the expanding conditions were changed as shown in Table 3, and expanded beads having a bulk ratio of 44.8 times were produced. The second expanding step was not performed. In addition, a molded article was obtained in the same manner as in Example 1 using these first-step expanded beads.

As can be understood from Tables 2 and 4, according to the expanded beads obtained in Example 1 to 6, it is possible to obtain a molded article in which the black color is dense and the color unevenness is less noticeable. Such a molded article can be produced with high productivity in a wide range from a low molding heating temperature to a high molding heating temperature. Furthermore, the time required for water cooling during molding is short, and the molding cycle is shortened.

As shown in FIG. 6(*b*), it can be seen that the black molded article of Example 1 has a dense color, and color unevenness is not noticeable. In the other Examples as well, the color density was not inferior to that in Example 1, and color unevenness was not noticeable. In addition, according to Examples 1 to 6, expanded beads having a high closed cell content are obtained. Note that in Examples 1 to 6, blocking in the second expanding step did not occur. Comparison between Example 1 and Example 2 indicates that in a case where the ratio $M_2/M_1$ of the bulk ratio $M_2$ of the second-step expanded beads to the bulk ratio $M_1$ of the first-step expanded beads was 1.8 or more, it was possible to produce a denser black molded article.

As understood from Tables 3 and 5, in Comparative Examples 1 and 3, the molded articles were produced using the first-step expanded beads without performing the second expanding step, and thus the obtained molded articles had low blackness and color unevenness was noticeable at any molding pressure. As shown in FIG. 6(*a*), the molded article of Comparative Example 1 had a light black color and exhibited a light gray color, and color unevenness was also noticeable. In addition, the closed cell content of the expanded beads was also likely to decrease.

In Comparative Example 2, the bulk ratio $M_1$ of the first-step expanded beads was small, and the ratio $M_2/M_1$ of the bulk ratio $M_2$ of the second-step expanded beads to the bulk ratio $M_1$ of the first-step expanded beads was too small. Therefore, at any molding pressure, the obtained molded article had slightly low blackness and color unevenness was slightly noticeable.

In Comparative Example 4, although the second expanding step was not performed, the blending amount of carbon black was high, and thus, it was possible to produce a molded article having high blackness and less noticeable color unevenness. However, the blending amount of carbon black was too large, and thus, moldability was deteriorated, and the range of the molding heating temperature at which a molded article having high blackness and less noticeable color unevenness could be molded was narrow. In addition, the water cooling time was long.

In Comparative Example 5, the molded article was produced using the first-step expanded beads without performing the second expanding step, and thus the black color was slightly light and color unevenness was slightly noticeable at any molding pressure although the molded article had a relatively high density.

In Comparative Example 6, the ratio $M_2/M_1$ of the bulk ratio $M_2$ of the second-step expanded beads to the bulk ratio $M_1$ of the first-step expanded beads was too large, and thus the closed cell content of the obtained second-step expanded beads was reduced. In addition, in the second expanding step, blocking occurred, and thus the molding step was not performed.

In Comparative Example 7, it was possible to produce a molded article having high blackness and less noticeable color unevenness. However, there was no through-hole, and thus, moldability was deteriorated, and the range of the molding heating temperature at which a molded article having high blackness and less noticeable color unevenness could be molded was narrow. In addition, the water cooling time was long. Furthermore, in a case where the aging step was omitted, it was not possible to produce a good molded article.

In Comparative Example 8, the ratio $M_2/M_1$ of the bulk ratio $M_2$ of the second-step expanded beads to the bulk ratio $M_1$ of the first-step expanded beads was in the predetermined range of the present disclosure, but the bulk ratio $M_1$ of the first-step expanded beads was too large. Therefore, at any molding pressure, the obtained molded article had a slightly light black color and color unevenness was slightly noticeable.

The invention claimed is:

1. A method for producing polypropylene-based resin expanded beads each having a tubular shape with a through-hole, the method comprising:

a first expanding step of impregnating polypropylene-based resin particles dispersed in a dispersion medium with an inorganic physical blowing agent in a sealed container and releasing the resin particles together with the dispersion medium from the sealed container to a lower pressure environment than a pressure in the sealed container to obtain first-step expanded beads having a bulk ratio of $M_1$; and a second expanding step of further expanding the first-step expanded beads by increasing a pressure in cells of the first-step expanded beads and then heating the first-step expanded beads to obtain polypropylene-based resin expanded beads having a bulk ratio of $M_2$, wherein each of the resin particles has a tubular shape having a through-hole, the resin particles contain carbon black, and a content of the carbon black in the resin particles is 0.1 wt % or more and 5 wt % or less, the bulk ratio $M_1$ of the first-step expanded beads is 5 times or more and 25 times or less, and a ratio $M_2/M_1$ of the bulk ratio $M_2$ of the polypropylene-based resin expanded beads to the bulk ratio $M_1$ of the first-step expanded beads is 1.2 or more and 3.0 or less.

2. The method for producing polypropylene-based resin expanded beads according to claim 1, wherein the bulk ratio $M_2$ of the polypropylene-based resin expanded beads is 10 times or more and 75 times or less.

3. The method for producing polypropylene-based resin expanded beads according to claim 1, wherein the ratio $M_2/M_1$ of the bulk ratio $M_2$ of the polypropylene-based resin expanded beads to the bulk ratio $M_1$ of the first-step expanded beads is 1.8 or more and 2.5 or less.

4. The method for producing polypropylene-based resin expanded beads according to claim 1, wherein the through-hole has a circularity of 0.90 or more in a cross section perpendicular to a penetration direction of the through-hole of each of the first-step expanded beads.

5. The method for producing polypropylene-based resin expanded beads according to claim 1, wherein in the first expanding, a temperature Tu of an atmosphere to which the polypropylene-based resin particles are released is lower than 80 °C.

6. The method for producing polypropylene-based resin expanded beads according to claim 1, wherein the polypropylene-based resin expanded beads each have a multilayer structure having a cover layer which includes a polyolefin-based resin exhibiting a melting point Tms lower than a melting point Tmc of a polypropylene-based resin included in the polypropylene-based resin expanded beads.

7. The method for producing polypropylene-based resin expanded beads according to claim 1, wherein an average hole diameter d of the through-holes of the polypropylene-based resin expanded beads is less than 1 mm, and a ratio d/D of the average hole diameter d to an average outer diameter D of the polypropylene-based resin expanded beads is 0.4 or less.

8. The method for producing polypropylene-based resin expanded beads according to claim 1, wherein the polypropylene-based resin expanded beads have an average outer diameter D of 2 mm or more and 5 mm or less, and an average wall thickness t of 1.2 mm or more and 2 mm or less.

9. The method for producing polypropylene-based resin expanded beads according to claim 1, wherein the bulk ratio $M_2$ of the polypropylene-based resin expanded beads is more than 30 times and 75 times or less.

10. A method for producing a molded article of polypropylene-based resin expanded beads, the method comprising:

filling the polypropylene-based resin expanded beads obtained by the method of claim 1 in a mold; and supplying a heating medium to fusion-bond the expanded beads to each other.

* * * * *